(12) United States Patent
Bergan et al.

(10) Patent No.: US 10,969,777 B2
(45) Date of Patent: Apr. 6, 2021

(54) LOCAL DRONE IDENTIFICATION VERIFICATION

(71) Applicant: QUALCOMM Incorporated, San Diego, CA (US)

(72) Inventors: Charles Bergan, Cardiff, CA (US); Edward Harrison Teague, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 15/844,925

(22) Filed: Dec. 18, 2017

(65) Prior Publication Data
US 2018/0373238 A1    Dec. 27, 2018

Related U.S. Application Data

(60) Provisional application No. 62/524,312, filed on Jun. 23, 2017.

(51) Int. Cl.

| | |
|---|---|
| *G05D 1/00* | (2006.01) |
| *H04W 4/90* | (2018.01) |
| *G05D 1/10* | (2006.01) |
| *H04W 4/02* | (2018.01) |
| *G08G 5/00* | (2006.01) |
| *B64C 39/02* | (2006.01) |
| *B64D 47/02* | (2006.01) |

(52) U.S. Cl.
CPC ......... *G05D 1/0016* (2013.01); *B64C 39/024* (2013.01); *B64D 47/02* (2013.01); *G05D 1/0022* (2013.01); *G05D 1/0027* (2013.01); *G05D 1/0033* (2013.01); *G05D 1/104* (2013.01); *G08G 5/0069* (2013.01); *G08G 5/0082* (2013.01); *H04W 4/02* (2013.01); *H04W 4/90* (2018.02); *B64C 2201/141* (2013.01); *B64C 2201/146* (2013.01)

(58) Field of Classification Search
CPC .. G05D 1/0016; G05D 1/0027; G05D 1/0022; G05D 1/0033; G05D 1/104; H04W 4/02; H04W 4/90; G08G 5/0082; G08G 5/0069; B64D 47/02; B64C 2201/146; B64C 2201/141; B64C 39/024
See application file for complete search history.

(56) References Cited

U.S. PATENT DOCUMENTS

| 8,082,074 B2 * | 12/2011 | Duggan | G05D 1/0088 701/24 |
|---|---|---|---|
| 9,310,221 B1 * | 4/2016 | Downey | B64C 39/024 |
| 9,607,522 B2 * | 3/2017 | Downey | G07C 5/02 |
| 10,507,917 B2 * | 12/2019 | Taylor | G06K 9/0063 |
| 2010/0079729 A1 * | 4/2010 | Scanlon | G03B 21/00 353/13 |

(Continued)

OTHER PUBLICATIONS

International Search Report and Written Opinion—PCT/US2018/028872—ISA/EPO—Jul. 9, 2018. 16 pages.

*Primary Examiner* — Frederick M Brushaber
(74) *Attorney, Agent, or Firm* — Michael F. Taveira

(57) ABSTRACT

Systems, methods, and devices of the various embodiments enable local visual identification and verification of robotic vehicles. Various embodiments may enable disambiguation of a robotic vehicle from among a plurality of robotic vehicles.

38 Claims, 19 Drawing Sheets

(56) References Cited

U.S. PATENT DOCUMENTS

| | | | | |
|---|---|---|---|---|
| 2012/0299751 | A1* | 11/2012 | Verna | H04B 7/18504 |
| | | | | 340/945 |
| 2014/0374532 | A1* | 12/2014 | Duffy | G05D 1/104 |
| | | | | 244/2 |
| 2015/0316927 | A1* | 11/2015 | Kim | H04L 67/12 |
| | | | | 701/2 |
| 2016/0070265 | A1* | 3/2016 | Liu | G01C 21/00 |
| | | | | 701/3 |
| 2016/0274578 | A1* | 9/2016 | Arwine | G06F 21/6209 |
| 2017/0205827 | A1* | 7/2017 | Rezvani | B64C 39/024 |
| 2018/0270657 | A1* | 9/2018 | Amisano | H04L 63/0861 |
| 2018/0297557 | A1* | 10/2018 | Jin | B60R 25/40 |
| 2019/0056725 | A1* | 2/2019 | Su | G06F 1/163 |
| 2019/0187291 | A1* | 6/2019 | Troia | G06F 21/572 |
| 2019/0370906 | A1* | 12/2019 | Sakayanagi | G06Q 30/0224 |

\* cited by examiner

LOCAL DRONE IDENTIFICATION VERIFICATION

RELATED APPLICATIONS

This application claims the benefit of priority to U.S. Provisional Patent Application 62/524,312 entitled "Local Drone Identification Verification," filed Jun. 23, 2017, the entire contents of which are hereby incorporated by reference for all purposes.

BACKGROUND

Positively identifying robotic vehicles, such as aerial robotic vehicles, operating in a shared airspace can be difficult when many vehicles are visible, particularly when an observer is far from the robotic vehicles. Positive identifier (or "ID") mechanisms may be important for managing individual robotic vehicles, tracking regulatory compliance, and for efficiently and safely managing shared airspace resources. For example, identification of aerial robotic vehicles may be difficult in the situation of an observer attempting to wirelessly query or interact with a particular aerial robotic vehicle using a computing device when there are a number of similar looking robotic vehicles visible to the observer in a shared airspace. When several aerial robotic vehicles are operating in a shared airspace, the wireless connection between an observer's computing device does not help the observer visually distinguish one robotic vehicle among a plurality of robotic vehicles. Thus, while the observer's computing device may recognize and be able to control a particular robotic vehicle based on its identifier (ID), the observer's computing device provides no help to the observer in visually identifying and tracking the robotic vehicle.

SUMMARY

Systems, methods, and devices of the various embodiments enable local visual identification and verification of robotic vehicles. Various embodiments may enable disambiguation of a robotic vehicle from among a plurality of robotic vehicles. Various embodiments include methods that may be implemented in a processor or processing device of a robotic vehicle and that may include controlling one or more components of the robotic vehicle to execute an identifying/distinguishing task or maneuver. In some embodiments, the identifying/distinguishing task or maneuver may be one action or a series of actions. In some embodiments, the one action or series of actions may be one or more of performing a maneuver, controlling a visual indicator, generating an audible indicator, and sending data. In some embodiments, controlling the visual indicator may include activating or changing a light emitting device of the robotic vehicle.

Some embodiments may include controlling one or more components of the robotic vehicle to execute the identifying/distinguishing task or maneuver in response to a request from an observer's computing device that is different from an operator computing device for controlling the robotic vehicle.

Some embodiments may include receiving a disambiguation message from an observer's computing device and controlling one or more components of the robotic vehicle to execute the identifying/distinguishing task or maneuver in response to receiving the disambiguation message. Some embodiments may include forwarding the disambiguation message from the processor of the robotic vehicle to an operator's computing device and receiving an instruction to execute the identifying/distinguishing task or maneuver from the operator's computing device. Some embodiments may include establishing a radio link between the robotic vehicle and the observer's computing device prior to receiving the disambiguation message. In some embodiments, the disambiguation message may be sent in response to an identifier of the robotic vehicle being validated. In some embodiments, the disambiguation message may include an operator identifying task. In some embodiments, the operator identifying task may be a gesture or motion of an operator to be performed.

Some embodiments may include receiving an execution message prior to executing the identifying/distinguishing task or maneuver.

Some embodiments may include determining whether an identifying/distinguishing task or maneuver violates one or more vehicle constraints and blocking execution of the identifying/distinguishing task or maneuver in response to determining that the identifying/distinguishing task or maneuver violates one or more vehicle constraints.

Some embodiments may include controlling one or more components of the robotic vehicle to execute the identifying/distinguishing task or maneuver within an identification window of time.

Various embodiments include methods that may be implemented in a processor or processing device of a robotic vehicle and that may include sending a disambiguation message to an observer's computing device and controlling one or more components of the robotic vehicle to execute the identifying/distinguishing task or maneuver.

Some embodiments may include determining whether an emergency condition is occurring and controlling one or more components of the robotic vehicle to execute an identifying/distinguishing task or maneuver in response to determining that the emergency condition is occurring. In some embodiments, the identifying/distinguishing task or maneuver may be one action or a series of actions. In some embodiments, the one action or series of actions may be one or more of performing a maneuver, controlling a visual indicator, generating an audible indicator, and sending data. In some embodiments, controlling the visual indicator may include activating or changing a light emitting device of the robotic vehicle.

Further embodiments may include a robotic vehicle having a processor configured with processor executable instructions to perform operations of any of the methods summarized above. Further embodiments may include a robotic vehicle having means for performing functions of any of the methods summarized above. Further embodiments may include a processing device configured for use in a robotic vehicle and configured to perform operations of any of the methods summarized above.

BRIEF DESCRIPTION OF THE DRAWINGS

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1:
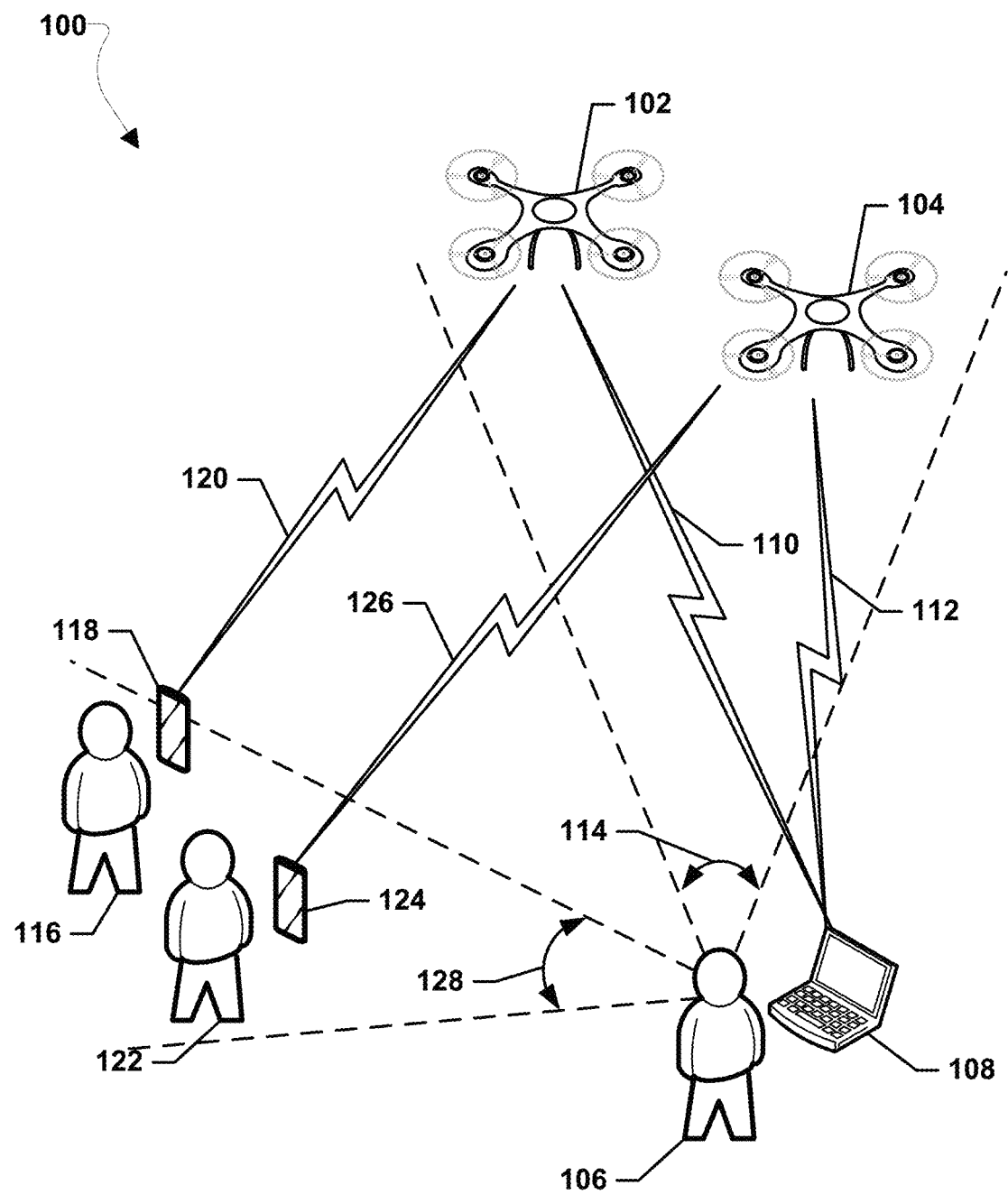
FIG. 1 is a system block diagram of robotic vehicles operating according to various embodiments.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computing device" refers to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, wireless robotic vehicle controllers, satellite or cable set top boxes, streaming media players (such as, ROKU® or CHROMECAST® or FIRE TV™), smart televisions, digital video recorders (DVRs), and similar personal electronic devices which include a programmable processor and memory and circuitry configured to perform operations as described herein.

As used herein, the terms "robotic vehicle" and "drone" refer to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

Positively identifying robotic vehicles, such as aerial vehicles, operating in a shared airspace can be difficult when many vehicles are visible, particularly when an observer is far from the robotic vehicles. Positive identifier (or "ID") mechanisms are essential for managing individual robotic vehicles, tracking regulatory compliance, and for efficiently and safely managing shared airspace resources. There are technologies that provide a reliable ID mechanism for identifying and authenticating the claimed identity of a robotic vehicle and/or robotic vehicle operator. Some ID mechanism technologies provide digital IDs that are based on internet protocol (IP) certificates, such as secure socket layer (SSL) certificates and transport layer security (TLS) certificates. Such digital certificates can be transmitted over many types of wireless connections, both local (e.g., Wi-Fi®, Bluetooth®, etc.) and wide-area (e.g., cellular, such as Code Division Multiple Access (CDMA), Time Division Multiple Access (TDMA), Global System for Mobility (GSM), 3G, 4G, Long Term Evolution (LTE), etc.).

A particular problem arises in the situation of an observer attempting to wirelessly query or interact with a particular robotic vehicle using a computing device ("observer's computing device") while visually observing at least some portion of the plurality of robotic vehicles in a shared airspace. When several robotic vehicles are operating in a shared airspace, the wireless connection between an observer's computing device does not help the observer visually distinguish the robotic vehicle among the plurality of robotic vehicles that is associated with the robotic vehicle identifier (ID) being tracked by the observer's computing device. Observers, such as law enforcement officers, property owners, emergency personnel, or any other individuals visually observing robotic vehicles, need to disambiguate between robotic vehicles being observed or controlled in order to ensure appropriate actions are taken in regard to a specific robotic vehicle. For example, a law enforcement officer needs to correctly differentiate a selected robotic vehicle linked to an ID from another robotic vehicle before disabling the selected robotic vehicle.

Systems, methods, and devices of the various embodiments enable local visual identification and verification of robotic vehicles. Various embodiments may enable visual disambiguation of a robotic vehicle from among a plurality of robotic vehicles. Various embodiments may enable disambiguating a robotic vehicle (e.g., an aerial vehicle) identification when multiple robotic vehicles are operating (e.g., flying, etc.) in close proximity. In some embodiments, in response to establishment of a communication channel (e.g., radio link, etc.) to an identified and authenticated robotic vehicle (e.g., a robotic vehicle with a valid identifier verified by a SSL certificate, TLS certificate, or other cryptographic token), the connected observer's computing device (e.g., a law enforcement official's laptop on the ground or any other location that allows observation of the robotic vehicles) may generate and send a disambiguation message. A disambiguation message may be a request configured to cause a robotic vehicle to execute an identifying/distinguishing task or maneuver (e.g., perform a movement and/or light flash) and a disambiguation message may be referred to as a "request". In response to receiving the disambiguation message, the robotic vehicle may execute an identifying/distinguishing task or maneuver (e.g., perform a movement and/or light flash) that enables the observer to positively identify or distinguish the connected robotic vehicle. In some embodiments, this identifying/distinguishing task or maneuver may be executed within an identification time window to enable identity disambiguation with low risk of spoofing by other vehicles.

In some embodiments, a processor of the robotic vehicle may be configured to autonomously control one or more components of the robotic vehicle to execute an identifying/distinguishing task in response to receiving a disambiguation message. In some embodiments, a processor of a robotic vehicle may forward a disambiguation message to an operator's computing device in response to receiving a disambiguation message. A processor of the operator's computing device may be configured to cause the operator's computing device to display an indication of the identifying/distinguishing task or maneuver in response to receiving the forwarded disambiguation message. For example, a display of the operator's computing device may be controlled to display a pop-up window indicating a need to perform an identifying/distinguishing task or maneuver. In response to receiving an input corresponding to the identifying/distinguishing task or maneuver from the operator, the processor of the operator's computing device may send an instruction to the processor of the robotic vehicle to execute the identifying/distinguishing task or maneuver. In response to receiving the instruction to execute the identifying/distinguishing task or maneuver, the processor of the robotic vehicle may control one or more components of the robotic vehicle to execute the identifying/distinguishing task or maneuver.

In some embodiments, a disambiguation messages may be generated by a processor of an observer's computing device (e.g., a processor of a law enforcement official's laptop) in response to a user input indication. For example, in response to a user input indication corresponding to a button press event, touch screen selection, etc., the processor of the observer's computing device may generate the disambiguation message. The disambiguation message may be a request generated in response to the user input indication and configured to cause a robotic vehicle to execute an identifying/distinguishing task or maneuver (e.g., perform a movement and/or light flash).

In some embodiments, the disambiguation message may indicate the identifying/distinguishing task or maneuver to be executed by the robotic vehicle. For example, the disambiguation message may be a request to execute the indicated identifying/distinguishing task or maneuver. In some embodiments, the disambiguation message may indicate the identifying/distinguishing task or maneuver explicitly, such as by including an identifier of the identifying/distinguishing task or maneuver.

In some embodiments, the disambiguation message may obfuscate the identifying/distinguishing task or maneuver. For example, the disambiguation message may indicate the received identifier of the robotic vehicle and the robotic vehicle or observer's computing device may determine the identifying/distinguishing task or maneuver based on stored instructions, such as stored instructions correlating the received identifier to a predetermined identifying/distinguishing task or maneuver (e.g., execute a specific predetermined identifying/distinguishing task or maneuver in response to receiving the disambiguation message including a specific identifier, etc.). As a specific example, the stored instructions may include ten different identifying/distinguishing task or maneuvers correlated with numbers zero to nine, and the received identifier may indicate which of the ten identifying/distinguishing task or maneuver to perform. As another example, the disambiguation message may include a hash of the received identifier of the robotic vehicle and the robotic vehicle or observer's computing device may determine the identifying/distinguishing task or maneuver based on stored instructions, such as stored instructions correlating hash values with a predetermined identifying/distinguishing task or maneuver (e.g., execute a specific predetermined identifying/distinguishing task or maneuver in response to receiving a disambiguation message including a specific hash value, execute a specific predetermined identifying/distinguishing task or maneuver in response to receiving a disambiguation message including a hash value matching a hash of the robotic vehicle's identifier, etc.). As a further example, the disambiguation message may include instructions for operations for the robotic vehicle or observer's computing device to perform to determine the identifying/distinguishing task or maneuver based on stored instructions, such as stored instructions correlating resulting values with a predetermined identifying/distinguishing task or maneuver (e.g., the disambiguation message may include an instruction to divide the robotic vehicle's tail number by two and execute a specific predetermined identifying/distinguishing task or maneuver corresponding to the resulting value, etc.). By obfuscating the identifying/distinguishing task or maneuver in the disambiguation message, the likelihood of false positives and spoofing may be reduced.

In some embodiments, the identifying/distinguishing task or maneuver indicated in the disambiguation message may be selected automatically by the processor of the observer's computing device during disambiguation message generation. In some embodiments, the identifying/distinguishing task or maneuver indicated in the disambiguation message may be selected by the operator via user input (e.g., a touch screen selection from a dropdown menu listing available identifying/distinguishing task or maneuvers).

In some embodiments, an identifying/distinguishing task or maneuver may include one or more actions. For example, the identifying/distinguishing task or maneuver may include a maneuver for the robotic vehicle to perform (e.g., a barrel roll, wing tip, hover, climb, drop, zig-zag, etc.). As another example, the identifying/distinguishing task or maneuver may include a visual indicator for the robotic vehicle to operate, such as activate or otherwise illuminate a light or other light emitting device, turn on/off a light emitting diode (LED) or other light emitting device, flash a display or other light emitting device, change an LED or other light emitting device color, and the like. As another example, the identifying/distinguishing task or maneuver may be generating an audible indicator, such as turning on a speaker to output a sound, change a sound output by a speaker, turn on/off a horn, or the like. As a further example, the identifying/distinguishing task or maneuver may include an indication of data for the robotic vehicle to provide to the observer's computing device. As examples, the robotic vehicle may provide one or more of an image file of the robotic vehicle, a public key, information unique to the robotic vehicle (e.g., a modem serial number, etc.), current flight characteristics (e.g., altitude, heading, global positioning system (GPS) coordinates, etc.), or any other type data to assist in identifying the robotic vehicle. The observer's computing device may display the received data to the observer to assist in the observer identifying the robotic vehicle. Some identifying/distinguishing tasks or maneuvers may be more suitable for certain situations than other identifying/distinguishing task or maneuvers. For example, at some distances lights may not be visible in the daylight and a more preferable action may be to perform a barrel roll or other maneuver to enable the observer to easily identify the robotic vehicle. As another example, maneuvers may not be visible at night and flashing a light may be preferable.

In some embodiments, an identifying/distinguishing task or maneuver may include multiple actions/indications/maneuvers (e.g., a series or sequence) to be executed by a robotic vehicle. For example, a disambiguation message may require a robotic vehicle to flash an orange light emitting diode (LED), flash a LED green, and then flash the LED orange. As another example, the disambiguation message may require the robotic vehicle to flash the LED, tip a wing, and then perform a barrel roll or other specified maneuver. Identifying/distinguishing tasks or maneuvers including a series of actions may provide benefits, including that a series of actions reduces the chances of false positives since it is unlikely another robotic vehicle will randomly perform the same actions in a given identification window of time. A series of actions may make spoofing more difficult since it is unlikely to guess the sequence. Further, a series of actions may provide a more robust method of distinguishing vehicles, such as in case the observer fails to see one of the actions in the series or the robotic vehicle is not capable of performing one of the actions, performing, for example, three out of four actions in sequence may be sufficient. Also, a series of actions may allow for a larger identification window in which to respond to the disambiguation message, for example because the likelihood of false positives and spoofing may be reduced.

In some embodiments, the identification window may be a period of time during which an identifying/distinguishing task or maneuver must be executed. Identification window lengths may be any period of time, such as one second, two seconds, thirty seconds, a minute, etc. The shorter the period of time the less the likelihood of false positives or spoofing. In some embodiments, the identification window may be indicated in the disambiguation message. In some embodiments, the identification window may occur immediately upon receiving a disambiguation message. As examples, the identification window may be within two seconds after receiving a disambiguation message, within thirty seconds after receiving a disambiguation message, etc. This immediate start of the identification window may mitigate false positives, spoofing, etc.

In some embodiments, the identification window may occur a certain time after receiving a disambiguation message. For example, the identification window may start sixty seconds after receiving the disambiguation message. In some embodiments, the identification window may occur at a certain time. For example, the identification window may start at a specific GPS clock time (e.g., 7:12 pm). The period to delay the start of the identification window or the time to start the identification window may be indicated in the disambiguation message. The advantage to delaying the start of the identification window to a time after receiving the disambiguation message may be that it gives the robotic vehicle and/or robotic vehicle operator some prep time (e.g., to go to a menu that allows performing whatever identifying/distinguishing task or maneuver was requested). This delay may still prevent false positives and spoofing as any such actions before the delayed start may not suffice for authentication purposes. In some embodiments, timing synchronization may occur between one or more of the observer's computing device, robotic vehicle, and operator's computing device to support identification window timing. For example, the one or more of the observer's computing device, robotic vehicle, and operator's computing device may synchronize to GPS time.

In some embodiments, disambiguation message may indicate that the execution of the identifying/distinguishing task or maneuver is to be delayed until an execution message is received. The execution message may be a message from the observer's computing device indicating that the identifying/distinguishing task or maneuver should be executed. In this manner, the observer may state the action to perform and that the robotic vehicle/robotic vehicle operator should be prepared to receive a follow-up notification at a certain time or within a window at which the action is to be performed. For example, the disambiguation message may be a request that a LED should be flashed in response to the execution message. The observer's computing device may send the execution message as the next follow-up notification and the robotic vehicle/robotic vehicle operator may execute the identifying/distinguishing task or maneuver in response to receiving the execution message (e.g., flash the LED). The identification window may begin upon the receipt of the execution message or the execution message may indicate the identification window of time.

In some embodiments, a processor of a robotic vehicle may be configured to determine whether an identifying/distinguishing task or maneuver violates one or more vehicle constraints in response to receiving a disambiguation message. Vehicle constraints may be limitations on the operations that a robotic vehicle can perform. For example, vehicle constraints may be associated with the design of the vehicle (e.g., the vehicle aerodynamics may not support certain maneuvers, the vehicle may lack lights, etc.). As another example, vehicle constraints may be associate with the mission of the robotic vehicle (e.g., the robotic vehicle may be a military vehicle that should not turn on its lights during a mission, the robotic vehicle may be carrying a heavy and/or delicate payload limiting its maneuverability, etc.) In response to determining that a specified identifying/distinguishing task or maneuver violates one or more vehicle constraints, the processor of the robotic vehicle may block the execution of the identifying/distinguishing task or maneuver. For example, the processor may ignore or drop the disambiguation message and/or the processor may not pass the identifying/distinguishing task or maneuver to an avionics module. In some embodiments, in response to blocking the identifying/distinguishing task or maneuver execution, the processor may send an indication of the constraint violation to the observer's computing device. As examples, the indication may be a message indicating that the robotic vehicle is on a military mission, cannot perform a barrel roll, etc. In response to determining that a specified identifying/distinguishing task or maneuver violates one or more vehicle constraints, the processor of the robotic vehicle may transmit to the observer's computing device one or more (e.g., a list) alternative tasks or maneuvers that the robotic vehicle can perform instead. For example, if the processor of the robotic vehicle determines that performing a barrel roll as indicated in the disambiguation message would violate a flight control law or restriction, the processor may transmit a message to the observer's computing device suggesting an alternative action, such as "flash lights according to Morse Code Z-R-X." In some embodiments, the processor of the robotic vehicle may transmit a different suggestion for alternative task or maneuvers each time the processor determines that the identified or requested task or maneuver cannot be performed so as to reduce the risk of copying or spoofing by other vehicles.

In some embodiments, a disambiguation message may include an operator identifying task. An operator identifying task may be an indication of an action an operator of a robotic vehicle should take to identify him or herself visually. For example, an operator identifying task may be an indication to an operator of a robotic vehicle to wave his or her arm in the air, turn around, or make some other type of motion/gesture that the observer can see. In some embodiments, a processor of a robotic vehicle may be configured to forward a disambiguation message including an operator identifying task to the operator's computing device. In response to receiving the disambiguation message including an operator identifying task, the processor of the operator's computing device may display an indication of the operator identifying task. As examples, the processor may control a display or speaker of the observer's computing device to output a message of "wave an arm above your head." The observer may look for an operator waving an arm above his or her head to identify the operator associated with the robotic vehicle receiving the disambiguation message.

In some embodiments, a robotic vehicle may generate an identifier message indicating an identifying/distinguishing task or maneuver the robotic vehicle is going to execute within an identification window or is already executing. The identifier message may be periodically sent by the robotic vehicle or may be sent in response to the robotic vehicle receiving an identifier request. An observer's computing device receiving the identifier message may display an indication of the identifying/distinguishing task or maneuver. In this manner, identifying/distinguishing tasks or maneuvers may be executed and indicated to observers without needing a disambiguation message to be sent by the observer.

In some embodiments, a robotic vehicle may execute an identifying/distinguishing task or maneuver in response to an emergency condition occurring. For example, when there is a radio outage detected by the robotic vehicle and/or when an emergency condition occurs (e.g., loss of GPS, motor failure, etc.) the robotic vehicle may execute a predetermined identifying/distinguishing task or maneuver to indicate the radio outage and/or emergency condition to an observer. For example, when a radio outage has occurred and GPS is lost, the robotic vehicle may execute a predetermined identifying/distinguishing task or maneuver to flash a LED red once every three seconds. An observer or operator may see that flashing red LED at the three second interval and determine that the robotic vehicle has experience a radio outage and GPS loss. This may enable the observer or operator to take an appropriate action for the indicated emergency condition even though the emergency condition could not be communicated via radio due to the radio outage.

In some embodiments, the processor of a robotic vehicle may be configured to perform an identifying/distinguishing task or maneuver in response to the establishment of a communication link with an observer's computing device without being prompted by a disambiguation message. In some embodiments, the processor of a robotic vehicle may be configured to perform a first identifying/distinguishing task or maneuver in response to the establishment of a communication link, and then perform another (e.g., specified) identifying/distinguishing task or maneuver in response to receiving a disambiguation message. In some embodiments, the processor of a robotic vehicle may be configured to determine the identity or authority of an observer's computing device establishing a communication link with the vehicle, and perform a first identifying/distinguishing task or maneuver in response to the communication link being established by a particular person or authority (e.g., law enforcement, aviation regulatory agent, etc.).

Various embodiments may be implemented within a communication system 100 of robotic vehicles, operators and observers, an example of which is illustrated in FIG. 1. The system 100 may include a plurality of robotic vehicles, such as robotic vehicle 102 and robotic vehicle 104, an observer's computing device 108, and a plurality of operator's computing devices, such as operator's computing device 118 and operator's computing device 124. The robotic vehicle 102 may communicate with the operator's computing device 118 via a wireless communications link 120 and via the wireless communications link 120 the robotic vehicle 102 and operator's computing device 118 may exchange data with one another. The robotic vehicle 104 may communicate with the operator's computing device 124 via a wireless communications link 126. Via this wireless communications link 126 the robotic vehicle 104 and operator's computing device 124 may exchange data with one another. The robotic vehicle 102 may communicate with the observer's computing device 108 via wireless communications link 110 and via the wireless communications link 110 the robotic vehicle 102 and observer's computing device 108 may exchange data with one another. The robotic vehicle 104 may communicate with the observer's computing device 108 via wireless communications link 112 and via the wireless communications link 112 the robotic vehicle 104 and observer's computing device 108 may exchange data with one another. The data exchanged via the various wireless communications links 110, 112, 120, 126 may include messages, such as disambiguation messages, identifier requests, identifiers, identifier messages, execution messages, instructions, etc.

The wireless communications links 110, 112, 120, 126 may be direct (device-to-device) wireless links or may be wireless communication links established via various wireless network connections (e.g., cellular data networks, Wi-Fi wireless local area networks (WLAN), etc.).

For example, connections to base stations and access points may provide the wireless communications links 110, 112, 120, 126. The base stations may include base stations configured to provide wireless communications over a wide area (e.g., macro cells), as well as small cells, which may include a micro cell, a femto cell, a pico cell, and other similar network access points. The access points may be configured to provide wireless communications over a relatively smaller area. Other examples of base stations and access points are also possible.

The wireless communications links 110, 112, 120, 126 may include a plurality of carrier signals, frequencies, or frequency bands, each of which may include a plurality of logical channels. The wireless communications links 110, 112, 120, 126 may utilize one or more radio access technologies (RATs). Examples of RATs that may be used in a wireless communication link include CDMA, TDMA, GSM, 3G, 4G, LTE, and other cellular RATs. Further examples of RATs that may be used in one or more of the various wireless communications links 110, 112, 120, 126 include medium range protocols such as Wi-Fi, LTE-U, LTE-Direct, LAA, MuLTEfire, and relatively short-range RATs such as ZigBee, Bluetooth, and Bluetooth Low Energy (LE).

The observer's computing device 108 may be operated by an operator 106 with a line of sight 114 (e.g., a field of vision) in which both robotic vehicle 102 and robotic vehicle 104 are visible. Additionally, in a line of sight 128 (e.g., a field of vision) of the observer 106, both an operator 116 operating the operator's computing device 118 and an operator 122 operating the operator's computing device 124 may be visible. As two robotic vehicles 102, 104 and two operators 116, 122 may be visible to the observer 106, wireless communications of an identifier between the observer's computing device 108 and the robotic vehicles 102, 104 alone may not enable the observer 106 to disambiguate between the robotic vehicles 102, 104.

Execution of an identifying/distinguishing task or maneuver by one of the robotic vehicles 102 and 104 in the line of sight 114 of the observer 106 may enable the observer to distinguish between the robotic vehicles 102, 104. Execution of an operator identifying task by one of the operators 116, 122 in the line of sight 128 of the observer 106 may enable the observer to distinguish between the operators 116, 122. Execution of an identifying/distinguishing task or maneuver by one of the robotic vehicles 102 and 104 in the line of sight 114 of the observer 106 in conjunction with execution of an operator identifying task by one of the operators 116, 122 in the line of sight 128 of the observer 106 may enable the observer to identify a particular one of the robotic vehicles 102, 104 operated by a corresponding operator 116, 122. Execution of an identifying/distinguishing task or maneuver by one of the robotic vehicles 102 and 104 in the line of sight 114 of the observer 106 and/or a line of sight of an operator 116, 122 may enable the observer 106 and/or operator 116, 122 to determine an emergency condition of the robotic vehicles 102, 104.

Figure 2:
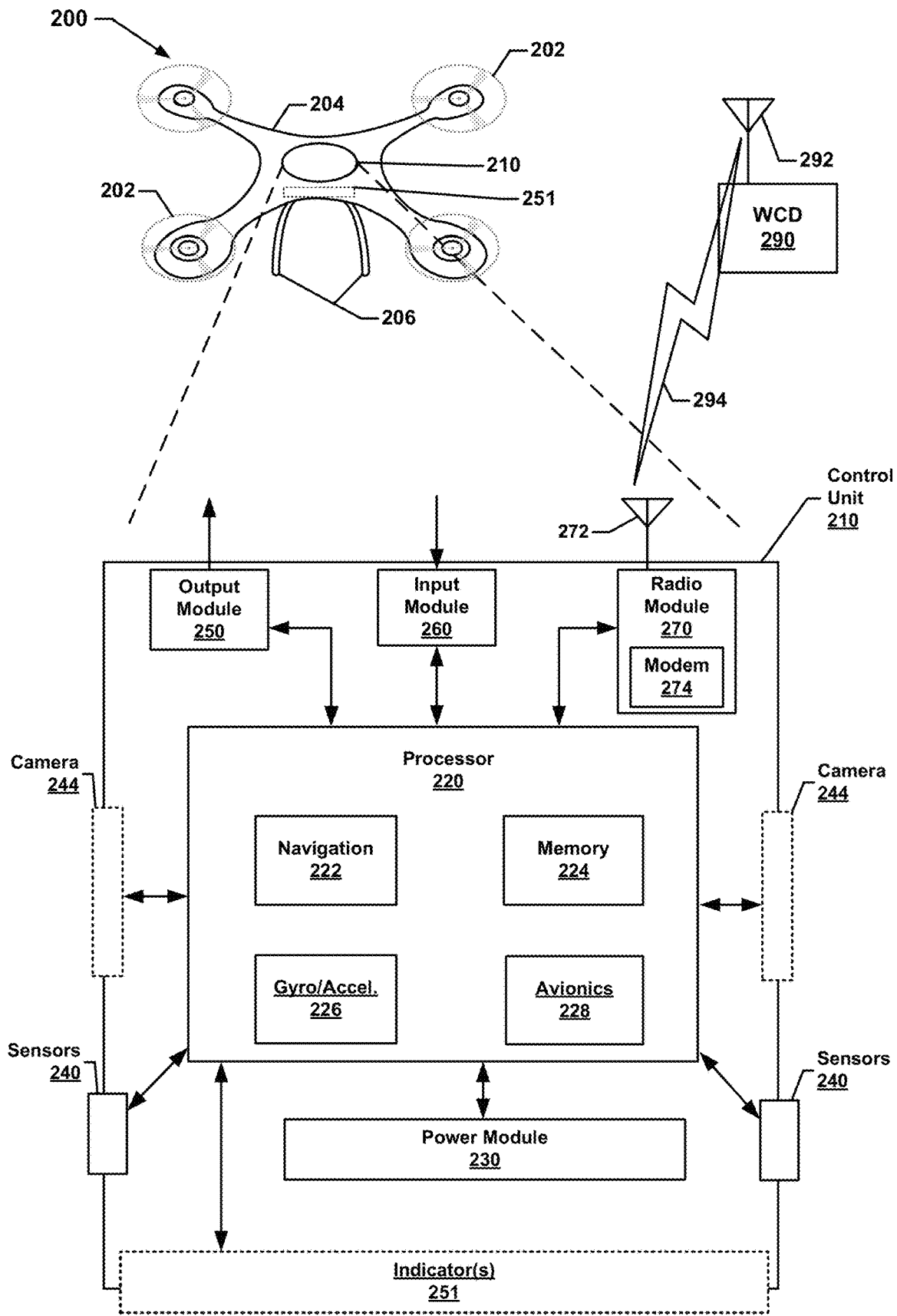
FIG. 2 is a component block diagram illustrating components of a robotic vehicle according to various embodiments.

Robotic vehicles may include winged or rotorcraft varieties of aerial robotic vehicles. FIG. 2 illustrates an example of a robotic vehicle 200, such as an aerial robotic vehicle, that utilizes multiple rotors 202 driven by corresponding motors to provide lift-off (or take-off) as well as other aerial movements (e.g., forward progression, ascension, descending, lateral movements, tilting, rotating, etc.). The robotic vehicle 200 is illustrated as an example of a robotic vehicle that may utilize various embodiments, but is not intended to imply or require that various embodiments are limited to aerial robotic vehicles or rotorcraft robotic vehicles. Various embodiments may be used with winged robotic vehicles, land-based autonomous vehicles, water-borne autonomous vehicles, space-based autonomous vehicles, etc.

With reference to FIGS. 1 and 2, the robotic vehicle 200 may be similar to the robotic vehicle 102 and robotic vehicle 104. The robotic vehicle 200 may include a number of rotors 202, a frame 204, landing columns 206 or skids, and one or more indicators 251, such as one or more LEDs, one or more incandescent bulb lights, one or more display screens, one or more speakers, one or more horns, one or more buzzers or bells, etc. The frame 204 may provide structural support for the motors associated with the rotors 202. The landing columns 206 may support the maximum load weight for the combination of the components of the robotic vehicle 200 and, in some cases, a payload. For ease of description and illustration, some detailed aspects of the robotic vehicle 200 are omitted such as wiring, frame structure interconnects, or other features that would be known to one of skill in the art. For example, while the robotic vehicle 200 is shown and described as having a frame 204 having a number of support members or frame structures, the robotic vehicle 200 may be constructed using a molded frame in which support is obtained through the molded structure. While the illustrated robotic vehicle 200 has four rotors 202, this is merely exemplary and various embodiments may include more or fewer than four rotors 202.

The robotic vehicle 200 may further include a control unit 210 that may house various circuits and devices used to power and control the operation of the robotic vehicle 200. The control unit 210 may include a processor 220, a power module 230, sensors 240, one or more cameras 244, an output module 250, an input module 260, and a radio module 270. Optionally, the control unit may also include one or more of the indicators 251. The power module 230, sensors 240, one or more cameras 244, output module 250, input module 260, radio module 270, and/or one or more indicators 251 may be connected to the processor 220.

The processor 220 may be configured with processor-executable instructions to control travel and other operations of the robotic vehicle 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with another computing device (e.g., operator's computing device 118, 124, observer's computing device 108, etc.) through wireless communications links, such as wireless communications links 110, 112, 120, 126.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the robotic vehicle 200 that may be used in navigation and positioning calculations, as well as providing data used in various embodiments.

The processor 220 may further receive additional information from the sensors 240, such as an image sensor or optical sensor (e.g., a sensor capable of sensing visible light, infrared, ultraviolet, and/or other wavelengths of light). The sensors 240 may also include a radio frequency (RF) sensor, a barometer, a humidity sensor, a sonar emitter/detector, a radar emitter/detector, a microphone or another acoustic sensor, a lidar sensor, a time-of-flight (TOF) 3-D camera, or another sensor that may provide information usable by the processor 220 for movement operations, navigation and positioning calculations, and determining environmental conditions. The sensors 240 may also include one or more sensors configured to detect temperatures generated by one or more robotic vehicle components, such as thermometers, thermistors, thermocouples, positive temperature coefficient sensors, and other sensor components.

The power module 230 may include one or more batteries that may provide power to various components, including the processor 220, the sensors 240, the one or more cameras 244, the output module 250, the input module 260, the one or more indicators 251, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components (including one or more indicators 251 if not connected directly to the processor 220).

The robotic vehicle 200 may be controlled through control of the individual motors of the rotors 202 as the robotic vehicle 200 progresses toward a destination. The control of the individual motors of the rotors 202 may enable the robotic vehicle to perform maneuvers (e.g., barrel rolls, dips, climbs, loops, etc.) The processor 220 may receive data from the navigation unit 222 and use such data in order to determine the present position and orientation of the robotic vehicle 200, as well as the appropriate course towards the destination or intermediate sites. In various embodiments, the navigation unit 222 may include a GNSS receiver system (e.g., one or more GPS receivers) enabling the robotic vehicle 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio module 270 may be configured to receive navigation signals, such as signals from aviation navigation facilities, etc., and provide such signals to the processor 220 and/or the navigation unit 222 to assist in robotic vehicle navigation. In various embodiments, the navigation unit 222 may use signals received from recognizable RF emitters (e.g., AM/FM radio stations, Wi-Fi access points, and cellular network base stations) on the ground.

The navigation unit 222 may include a planning application that may perform calculations to plan a path of motion for the robotic vehicle within a volumetric space ("path planning"). In some embodiments, the planning application may perform path planning using information including information about aspects of a task to be performed by the robotic vehicle, environmental condition information, an amount of heat that may be generated by one or more components of the robotic vehicle in performing the task, as well as one or more thermal constraints.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., a base station), a network access point (e.g., an access point), a beacon, a smartphone, a tablet, a laptop, or another computing device with which the robotic vehicle 200 may communicate. As specific examples, the WCD 290 may be the operator's computing devices 118, 124 or observer's computing device 108. The processor 220 may establish a bi-directional wireless communication link 294 via the modem 274 and the antenna 272 of the radio module 270 and the WCD 290 via a transmit/receive antenna 292. In some embodiments, the radio module 270 may be configured to support multiple connections with different wireless communication devices using different radio access technologies.

In some embodiments, the WCD 290 may be connected to a server through intermediate access points. In an example, the WCD 290 may be a server of a robotic vehicle operator, a third-party service (e.g., package delivery, billing, etc.), or a site communication access point. The robotic vehicle 200 may communicate with a server through one or more intermediate communication links, such as a wireless telephony network that is coupled to a wide area network (e.g., the Internet) or other communication devices. In some embodiments, the robotic vehicle 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera 244 or sensor, or may receive electronic signals from other components (e.g., a payload).

While various components of the control unit 210 are illustrated as separate components, some or all of the components (e.g., the processor 220, the output module 250, the radio module 270, and other units) may be integrated together in a single device or module, such as a system-on-chip module.

Figure 3A:
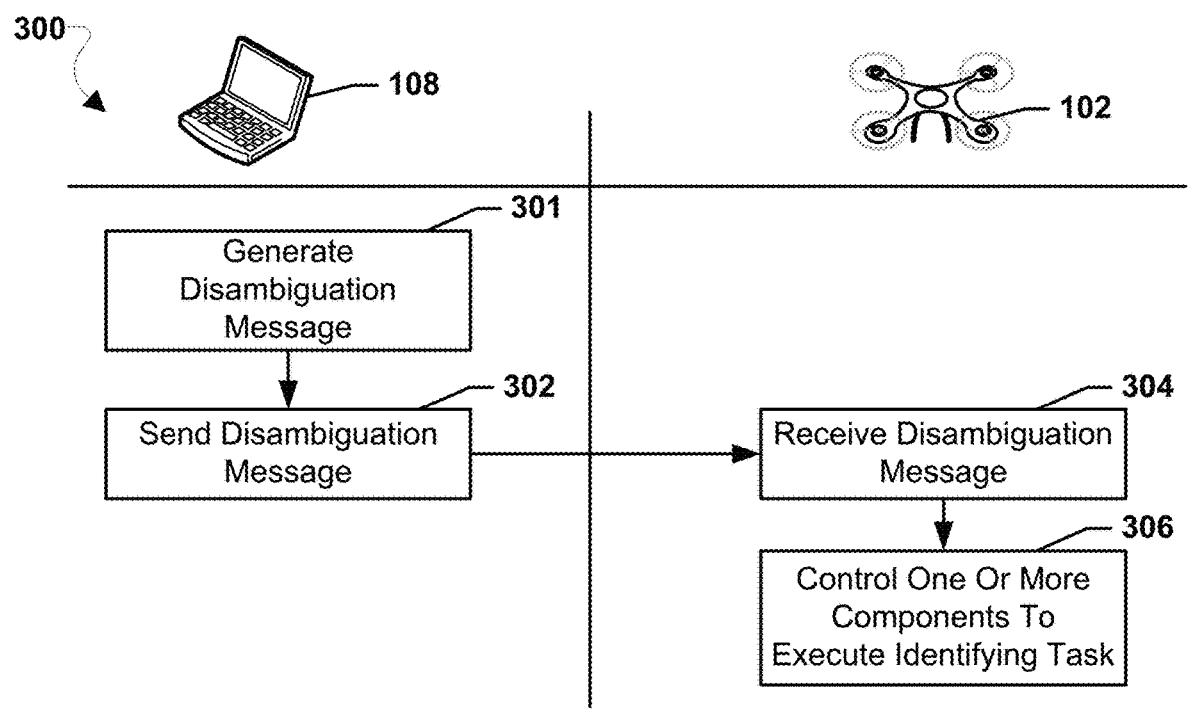
FIG. 3A is a process flow diagram illustrating a method for disambiguating a robotic vehicle according to some embodiments.

FIG. 3A illustrates a method 300 for disambiguating a robotic vehicle according to some embodiments. With reference to FIGS. 1-3A, the method 300 may be implemented in hardware components and/or software components of an observer's computing device (e.g., observer's computing device 108) and/or the robotic vehicle (e.g., 102, 104, 200), the operation of which may be controlled by one or more processors (e.g., the processor 220 and/or the like) of the robotic vehicle and/or observer's computing device.

In block 301, the observer's computing device processor may generate a disambiguation message. A disambiguation message may be a request configured to cause a robotic vehicle to execute an identifying/distinguishing task or maneuver (e.g., perform a movement and/or light flash). In some embodiments, a disambiguation messages may be generated by a processor of an observer's computing device (e.g., a processor of a law enforcement official's laptop) in response to a user input indication. For example, in response to a user input indication corresponding to a button press event, touch screen selection, etc., the processor of the observer's computing device may generate a disambiguation message.

In some embodiments, the disambiguation message may indicate an identifying/distinguishing task or maneuver to be executed by the robotic vehicle. In some embodiments, the disambiguation message may indicate the identifying/distinguishing task or maneuver explicitly, such as by including an identifier of the identifying/distinguishing task or maneuver.

In some embodiments, the disambiguation message may obfuscate the identifying/distinguishing task or maneuver. For example, the disambiguation message may indicate the received identifier of the robotic vehicle. As another example, the disambiguation message may include a hash of the received identifier of the robotic vehicle. As a further example, the disambiguation message may include instructions for operations for the robotic vehicle or observer's computing device to perform in order to determine the particular identifying/distinguishing task or maneuver to be performed.

In some embodiments, the identifying/distinguishing task or maneuver indicated in the disambiguation message may be selected automatically by the processor of the observer's computing device during generation of the disambiguation message generation. In some embodiments, the identifying/distinguishing task or maneuver indicated in the disambiguation message may be selected by the operator and indicated by a user input indication (e.g., a touch screen selection from a dropdown menu listing available identifying/distinguishing task or maneuvers).

In block 302, the observer's computing device processor may send the disambiguation message. For example, the disambiguation message may be sent via the wireless communication path 110, 112. By sending the disambiguation message, the observer's computing device processor may send a request for the robotic vehicle to execute the identifying/distinguishing task or maneuver. In block 304, the robotic vehicle processor may receive the disambiguation message.

In block 306, the robotic vehicle processor may control one or more components to execute the identifying/distinguishing task or maneuver. The processor of the robotic vehicle may be configured to autonomously control one or more components of the robotic vehicle to execute an identifying/distinguishing task or maneuver in response to receiving a disambiguation message. In this manner, an observer (such as observer 106) may disambiguate the robotic vehicle based at least in part on the execution of the identifying/distinguishing task or maneuver.

In some embodiments, the robotic vehicle processor may process the disambiguation message in block 306 to determine the identifying/distinguishing task or maneuver as part of controlling one or more components to execute the identifying/distinguishing task or maneuver. As an example, the robotic vehicle processor may extract an indication of the identifying/distinguishing task or maneuver from the disambiguation message.

As another example, the disambiguation message may indicate the received identifier of the robotic vehicle and as part of the operations in block 306 the robotic vehicle may determine the identifying/distinguishing task or maneuver based on stored instructions, such as stored instructions correlating the received identifier to a predetermined identifying/distinguishing task or maneuver (e.g., execute a specific predetermined identifying/distinguishing task or maneuver in response to receiving the disambiguation message including a specific identifier, etc.). As a specific example, the stored instructions may include ten different identifying/distinguishing task or maneuvers correlated with numbers zero to nine, and the received identifier may indicate which of the ten identifying/distinguishing task or maneuver to perform. As another example, the disambiguation message may include a hash of the received identifier of the robotic vehicle and the robotic vehicle may determine the particular identifying/distinguishing task or maneuver to be performed based on stored instructions, such as stored instructions correlating hash values with a predetermined identifying/distinguishing task or maneuver (e.g., execute a specific predetermined identifying/distinguishing task or maneuver in response to receiving a disambiguation message including a specific hash value, execute a specific predetermined identifying/distinguishing task or maneuver in response to receiving a disambiguation message including a hash value matching a hash of the robotic vehicle's identifier, etc.). As a further example, the disambiguation message may include instructions for operations for the robotic vehicle to perform in order to determine the identifying/distinguishing task or maneuver based on stored instructions, such as stored instructions correlating resulting values with a predetermined identifying/distinguishing task or maneuver (e.g., the disambiguation message may include an instruction to divide the robotic vehicle's tail number by two and execute a specific predetermined identifying/distinguishing task or maneuver corresponding to the resulting value, etc.).

In some embodiments, an identifying/distinguishing task or maneuver may include one or more actions. For example, the identifying/distinguishing task or maneuver may include a maneuver for the robotic vehicle to perform (e.g., a barrel roll, wing tip, hover, climb, drop, zig-zag, etc.). As another example, the identifying/distinguishing task or maneuver may include a visual indicator for the robotic vehicle to operate (e.g., activate a light or other light emitting device, turn on/off a light emitting diode (LED) or other light emitting device, flash a display or other light emitting device, change a LED or other light emitting device color, etc.). As another example, the identifying/distinguishing task or maneuver may include generating an audible indicator by the robotic vehicle (e.g., activating a speaker to output a sound, changing a sound output by a speaker, turning on/off a horn, etc.). As a further example, the identifying/distinguishing task or maneuver may include an indication of data for the robotic vehicle to provide to the observer's computing device. As examples, the robotic vehicle may provide one or more of an image file of the robotic vehicle, a public key, information unique to the robotic vehicle (e.g., a modem serial number, etc.), current flight characteristics (e.g., altitude, heading, global positioning system (GPS) coordinates, etc.) or any other type data to assist in identifying the robotic vehicle. The observer's computing device may display the received data to the observer to assist in the observer identifying the robotic vehicle.

In some embodiments, an identifying/distinguishing task or maneuver may include multiple actions/indications (e.g., a series or sequence) to be executed by a robotic vehicle. For example, in a disambiguation message may require that a robotic vehicle may have to flash light emitting diode (LED) orange, flash the LED green, and then flash the LED orange. As another example, the disambiguation message may require the robotic vehicle flash the LED, tip a wing, and then perform a barrel roll or other specified maneuver.

In some embodiments, the identification window may be a period of time in which an identifying/distinguishing task or maneuver must be executed. In some embodiments, the robotic vehicle processor may control one or more components to execute the identifying/distinguishing task or maneuver within the identification window of time. Identification window lengths may be any period of time, such as one second, two seconds, thirty seconds, a minute, etc. In some embodiments, the identification window may occur immediately upon receiving a disambiguation message. As examples, the identification window may be within two seconds after receiving a disambiguation message, within thirty seconds after receiving a disambiguation message, etc. In some embodiments, the identification window may occur a certain time after receiving a disambiguation message. For example, the identification window may start sixty seconds after receiving the disambiguation message. In some embodiments, the identification window may occur at a certain time. For example, the identification window may start at a specific GPS clock time (e.g., 7:12 pm). The period to delay the start of the identification window or the time to start the identification window may be indicated in the disambiguation message. In some embodiments, timing synchronization may occur between one or more of the observer's computing device and robotic vehicle, to support identification window timing.

Figure 3B:
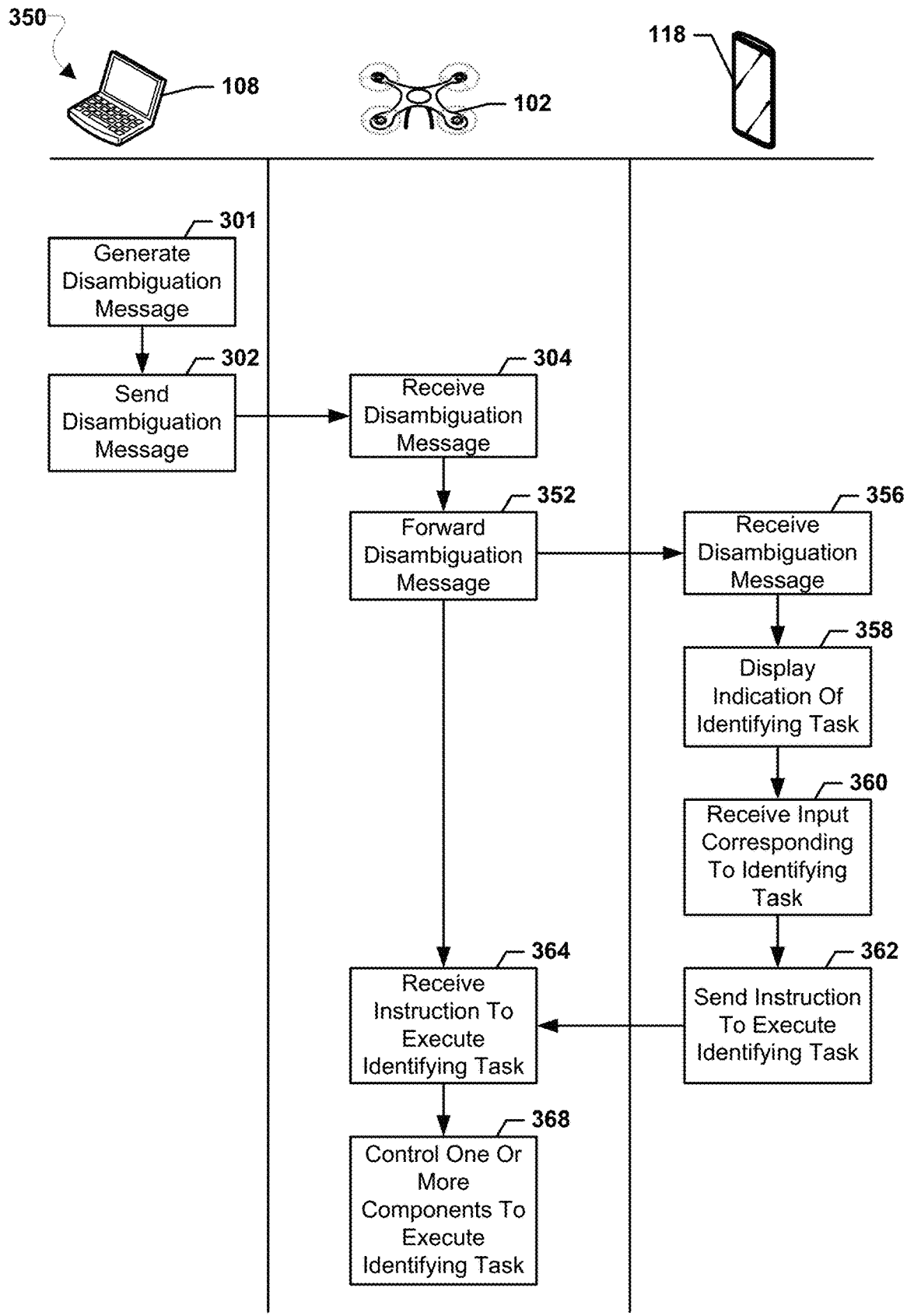
FIG. 3B is a process flow diagram illustrating a method for disambiguating a robotic vehicle according to some embodiments.

FIG. 3B illustrates a method 350 for disambiguating a robotic vehicle according to some embodiments. With reference to FIGS. 1-3B, the method 350 may be implemented in hardware components and/or software components of an observer's computing device (e.g., observer's computing device 108), the robotic vehicle (e.g., 102, 104, 200), and/or an operator's computing device (e.g., operator's computing device 118, 124), the operation of which may be controlled by one or more processors (e.g., the processor 220 and/or the like) of the robotic vehicle, observer's computing device, and/or operator's computing device.

In blocks 301, 302, and 304 the processors of the observer's computing device and robotic vehicle may perform like operations of like numbered blocks of the method 300 as described.

In block 352, the processor of the robotic vehicle may forward the disambiguation message to the processor of the operator's computing device. For example, the disambiguation message may be sent via the wireless communication path 120, 126. In block 356, the operator's computing device processor may receive the disambiguation message.

In block 358, the processor of the operator's computing device may display an indication of the identifying/distinguishing task or maneuver. For example, a display of the operator's computing device may be controlled to output a pop-up window indicating a need to perform an identifying/distinguishing task or maneuver. In this manner, the operator (e.g., 118, 124) may be notified of the identifying/distinguishing task or maneuver to be executed and in response may take an action to execute the identifying/distinguishing task or maneuver. In some embodiments, the operator's computing device may process the disambiguation message to determine the identifying/distinguishing task or maneuver as part of displaying the indication of the identifying/distinguishing task or maneuver. As an example, the operator's computing device processor may extract an indication of the identifying/distinguishing task or maneuver from the disambiguation message. As another example, the disambiguation message may indicate the received identifier of the robotic vehicle and the operator's computing device may determine the identifying/distinguishing task or maneuver based on stored instructions, such as stored instructions correlating the received identifier to a predetermined identifying/distinguishing task or maneuver (e.g., execute a specific predetermined identifying/distinguishing task or maneuver in response to receiving the disambiguation message including a specific identifier, etc.).

As a specific example, the stored instructions may include ten different identifying/distinguishing task or maneuvers correlated with numbers zero to nine, and the received identifier may indicate which of the ten identifying/distinguishing task or maneuver to perform. As another example, the disambiguation message may include a hash of the received identifier of the robotic vehicle and the operator's computing device processor may determine the identifying/distinguishing task or maneuver based on stored instructions, such as stored instructions correlating hash values with a predetermined identifying/distinguishing task or maneuver (e.g., execute a specific predetermined identifying/distinguishing task or maneuver in response to receiving a disambiguation message including a specific hash value, execute a specific predetermined identifying/distinguishing task or maneuver in response to receiving a disambiguation message including a hash value matching a hash of the robotic vehicle's identifier, etc.). As a further example, the disambiguation message may include instructions for operations for the operator's computing device processor to perform to determine the identifying/distinguishing task or maneuver based on stored instructions, such as stored instructions correlating resulting values with a predetermined identifying/distinguishing task or maneuver (e.g., the disambiguation message may include an instruction to divide the robotic vehicle's tail number by two and execute a specific predetermined identifying/distinguishing task or maneuver corresponding to the resulting value, etc.).

In some embodiments, an identifying/distinguishing task or maneuver may include one or more actions. For example, the identifying/distinguishing task or maneuver may include a maneuver for the robotic vehicle to perform (e.g., a barrel roll, wing tip, hover, climb, drop, zig-zag, etc.). As another example, the identifying/distinguishing task or maneuver may include a visual indicator for the robotic vehicle to operate (e.g., activate a light or other light emitting device, turn on/off a light emitting diode (LED) or other light emitting device, flash a display or other light emitting device, change a LED or other light emitting device color, etc.). As another example, the identifying/distinguishing task or maneuver may include generating an audible indicator by the robotic vehicle (e.g., activating a speaker to output a sound, changing a sound output by a speaker, turning on/off a horn, etc.). As a further example, the identifying/distinguishing task or maneuver may include an indication of data for the robotic vehicle or operator's computing device to provide to the observer's computing device. As examples, the robotic vehicle or operator's computing device may provide one or more of an image file of the robotic vehicle, a public key, information unique to the robotic vehicle (e.g., a modem serial number, etc.), current flight characteristics (e.g., altitude, heading, global positioning system (GPS) coordinates, etc.) or any other type data to assist in identifying the robotic vehicle. The observer's computing device may display the received data to the observer to assist in the observer identifying the robotic vehicle.

In some embodiments, an identifying/distinguishing task or maneuver may include multiple actions/indications (e.g., a series or sequence) to be executed by a robotic vehicle. For example, in a disambiguation message may require that a robotic vehicle may have to flash light emitting diode (LED) orange, flash the LED green, and then flash the LED orange. As another example, the disambiguation message may require the robotic vehicle flash the LED, tip a wing, and then perform a barrel roll or other specified maneuver.

In some embodiments, the identification window may be a period of time in which an identifying/distinguishing task or maneuver must be executed. In some embodiments, the operator must send instructions to cause the robotic vehicle to execute the identifying/distinguishing task or maneuver within the identification window of time. Identification window lengths may be any period of time, such as one second, two seconds, thirty seconds, a minute, etc. In some embodiments, the identification window may occur immediately upon receiving a disambiguation message. As examples, the identification window may be within two seconds after receiving a disambiguation message, within thirty seconds after receiving a disambiguation message, etc. In some embodiments, the identification window may occur a certain time after receiving a disambiguation message. For example, the identification window may start sixty seconds after receiving the disambiguation message. In some embodiments, the identification window may occur at a certain time. For example, the identification window may start at a specific GPS clock time (e.g., 7:12 pm). The period to delay the start of the identification window or the time to start the identification window may be indicated in the disambiguation message. In some embodiments, timing synchronization may occur between one or more of the observer's computing device, robotic vehicle, and observer's computing device to support identification window timing.

In block 360, the processor of the operator's computing device may receive an input corresponding to the identifying/distinguishing task or maneuver. The input corresponding to the identifying/distinguishing task or maneuver from the operator may be a button press, menu selection of an action on a touch screen, etc.

In block 362, the processor of the operator's computing device may send an instruction to execute the identifying/distinguishing task or maneuver to the processor of the robotic vehicle processor. For example, the instruction may be sent via the wireless communication path 120, 126.

In block 364, the robotic vehicle processor may receive the instruction to execute the identifying/distinguishing task or maneuver.

In block 368, the robotic vehicle processor may control one or more components to execute the identifying/distinguishing task or maneuver. The robotic vehicle processor may process the instruction to execute the identifying/distinguishing task or maneuver and/or the robotic vehicle may execute the identifying/distinguishing task or maneuver in a similar manner to that described with reference to block 306 of the method 300 as described. In this manner, an observer (such as observer 106) may disambiguate the robotic vehicle based at least in part on the execution of the identifying/distinguishing task or maneuver.

Figure 4A:
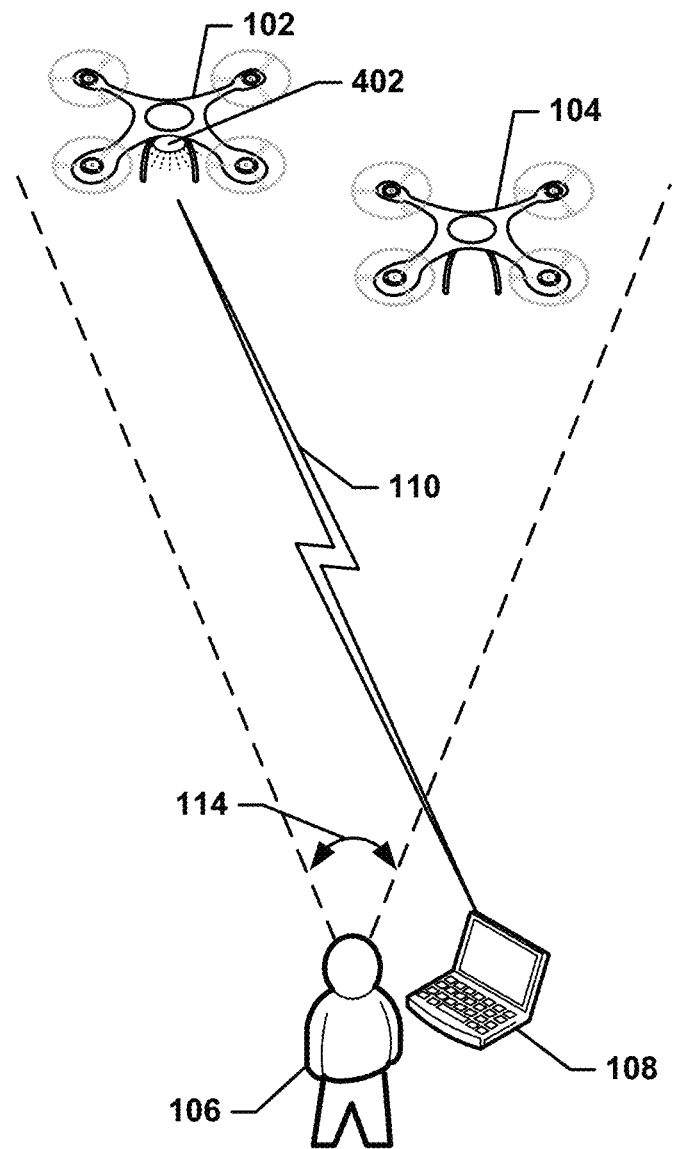
FIG. 4A is a system block diagram illustrating an example of a robotic vehicle identification being validated according to some embodiments.

FIG. 4A illustrates an example of a robotic vehicle 102 identification being validated according to an embodiment. With reference to FIGS. 1-4A, the identification validation may be performed according to operations of the methods 300 and/or 350. For example, the disambiguation message from the observer's computing device 108 may result in the robotic vehicle 102 flashing a light 402. In this manner, the observer 106 may determine that robotic vehicle 102, rather than robotic vehicle 104, is the connected robotic vehicle because robotic vehicle 102 is flashing a light 402 as indicated in the disambiguation message and robotic vehicle 104 is not.

Figure 4B:
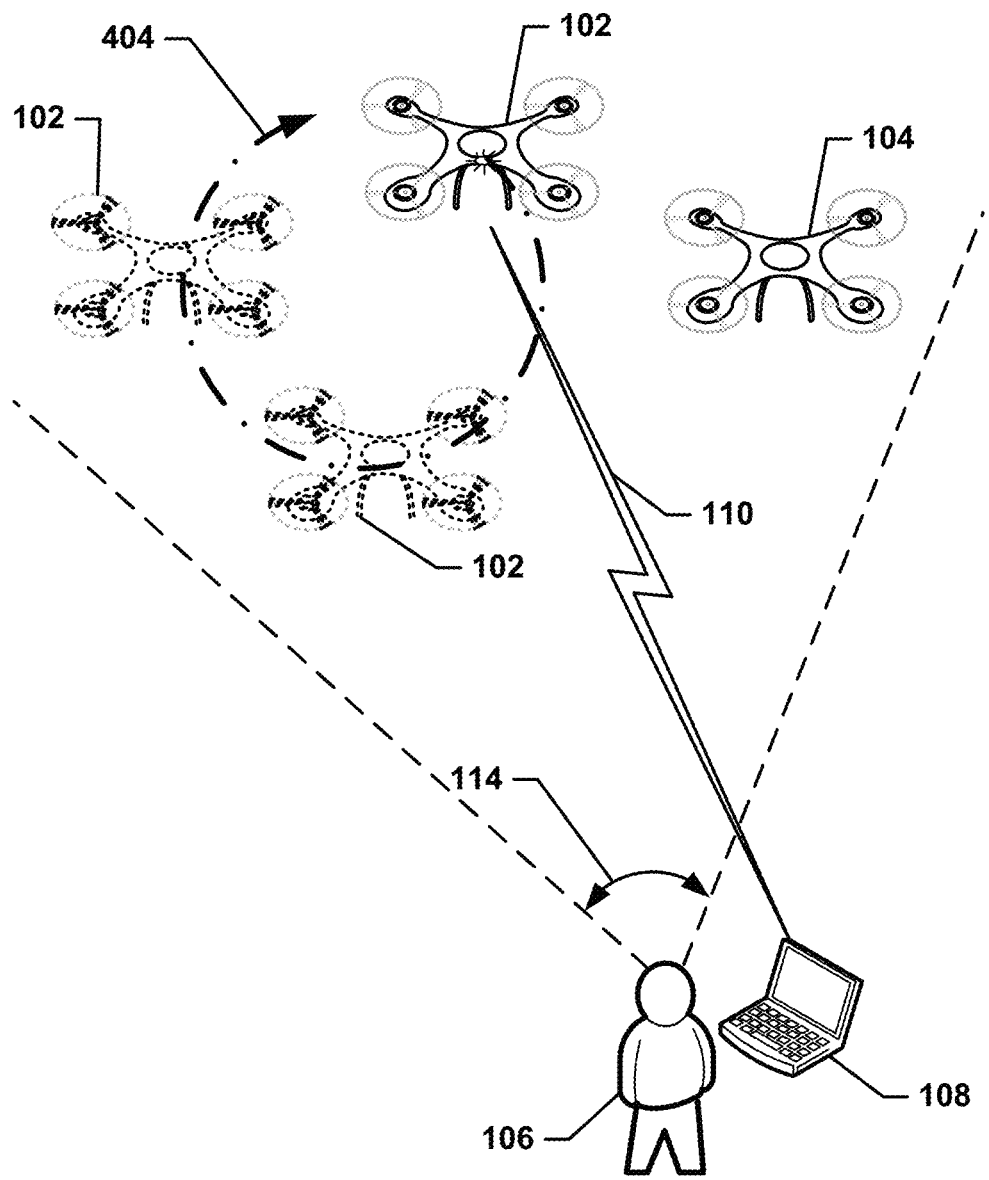
FIG. 4B is a system block diagram illustrating an example of a robotic vehicle identification being validated according to some embodiments.

FIG. 4B illustrates another example of a robotic vehicle 102 identification being validated according to an embodiment. With reference to FIGS. 1-4B, the identification validation may be performed according to operations of the methods 300 and/or 350. For example, the disambiguation message from the observer's computing device 108 may result in the robotic vehicle 102 flying a loop path 404. In this manner, the observer 106 may determine that robotic vehicle 102, rather than robotic vehicle 104, is the connected robotic vehicle because robotic vehicle 102 is flying a loop path 404 as indicated in the disambiguation message and robotic vehicle 104 is not.

Figure 4C:
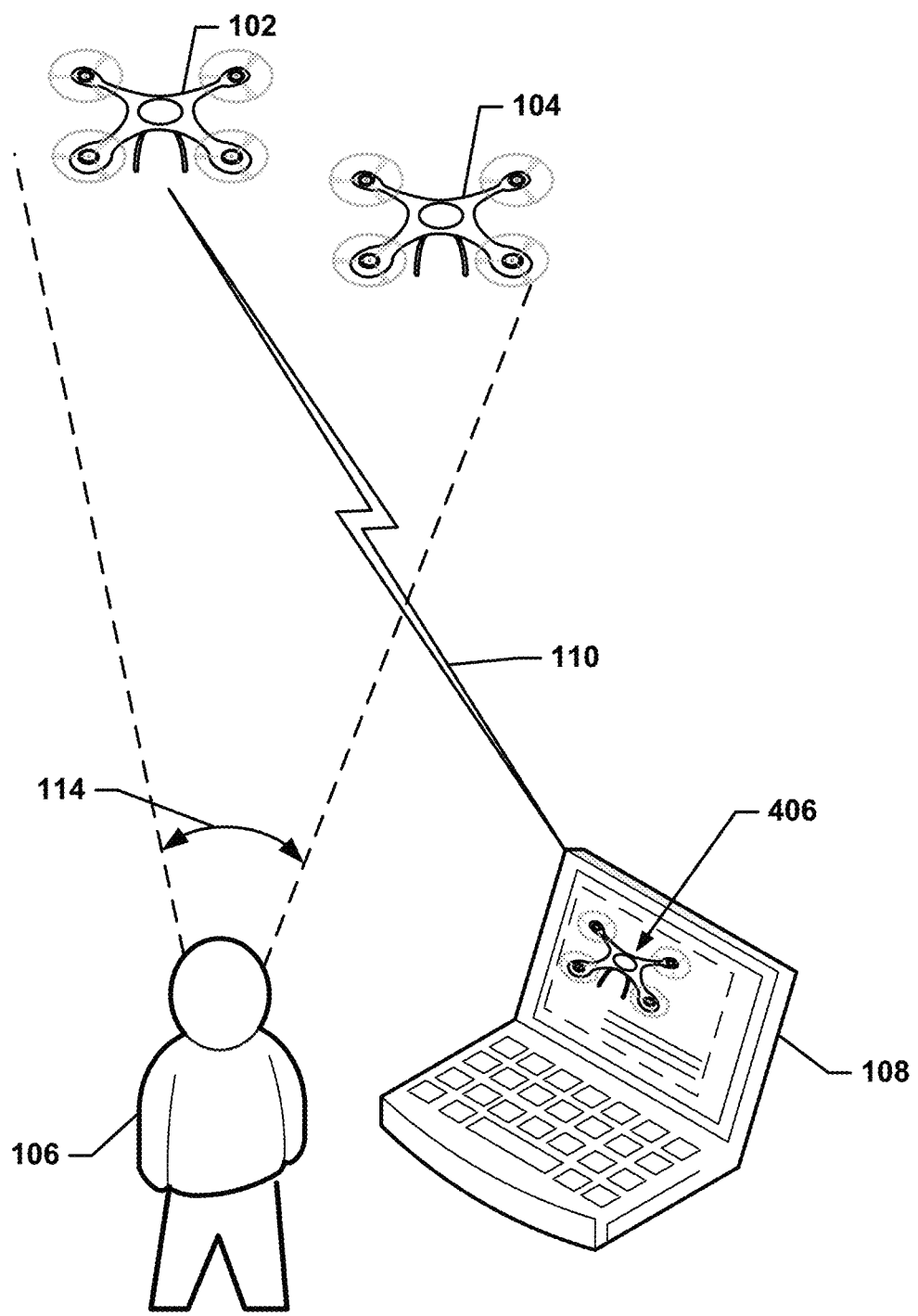
FIG. 4C is a system block diagram illustrating an example of a robotic vehicle identification being validated according to some embodiments.

FIG. 4C illustrates another example of a robotic vehicle 102 identification being validated according to an embodiment. With reference to FIGS. 1-4C, the identification validation may be performed according to operations of the methods 300 and/or 350. For example, the disambiguation message from the observer's computing device 108 may result in the robotic vehicle 102 sending data to the observer's computing device 108, such as an image 406 of the robotic vehicle 102. In this manner, the observer 106 may determine that robotic vehicle 102, rather than robotic vehicle 104, is the connected robotic vehicle because robotic vehicle 102 looks like the image 406, while robotic vehicle 104 may not look like the image 406.

In some embodiments, the examples illustrated in FIGS. 4A-4C may be combined. For example, robotic vehicle 102 may flash light 402, fly a loop path 404, and send image 406 all in response to the disambiguation message.

Figure 5:
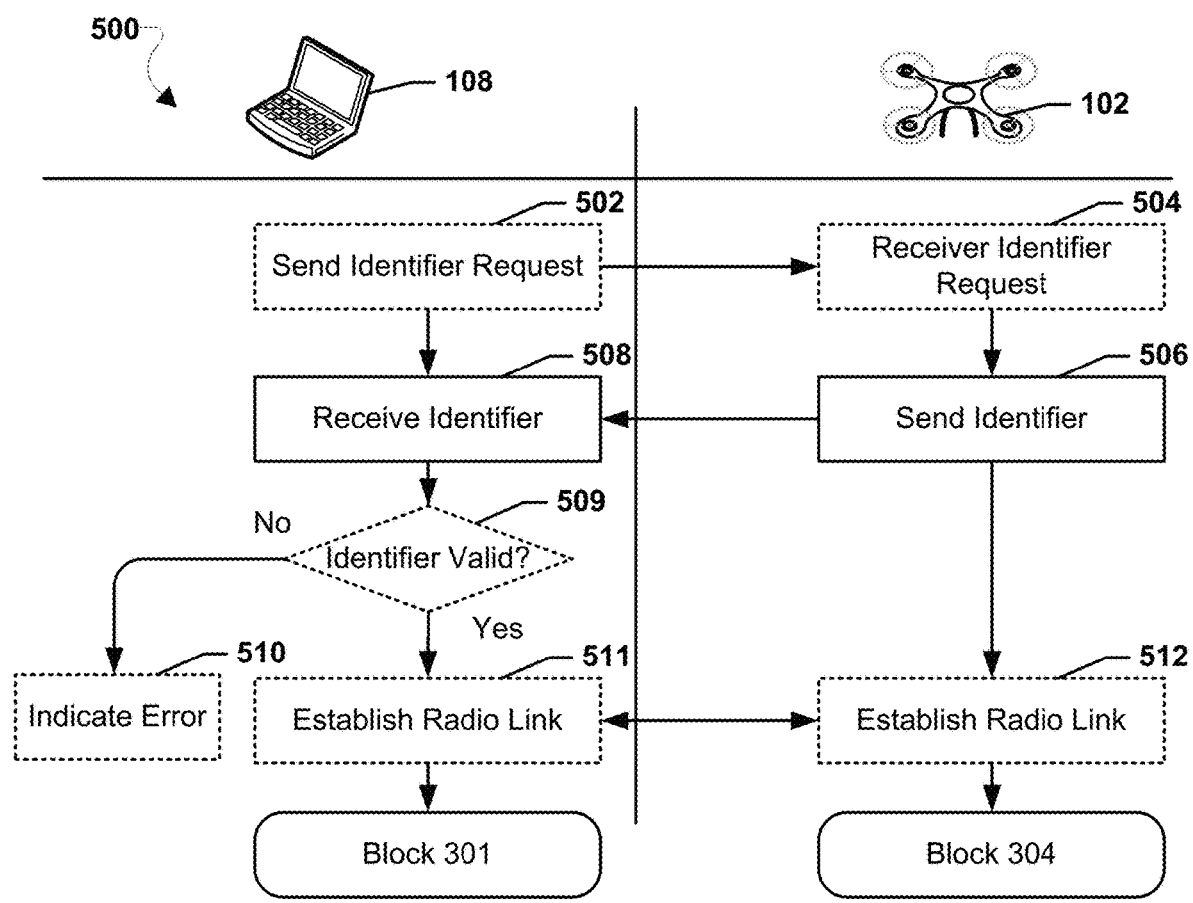
FIG. 5 is a process flow diagram illustrating a method for disambiguating a robotic vehicle according to some embodiments.

FIG. 5 illustrates a method 500 for disambiguating a robotic vehicle according to some embodiments. With reference to FIGS. 1-5, the method 500 may be implemented in hardware components and/or software components of an observer's computing device (e.g., observer's computing device 108) and/or the robotic vehicle (e.g., 102, 104, 200), the operation of which may be controlled by one or more processors (e.g., the processor 220 and/or the like) of the robotic vehicle and/or observer's computing device. In some embodiments, the operations of the method 500 may be performed in conjunction with the operations of the methods 300 and/or 350.

In optional block 502, the observer's computing device processor may send an identifier request. An identifier request may be a message requesting a robotic vehicle receiving the message send an identifier of the robotic vehicle. In optional block 504, the robotic vehicle processor may receive the identifier request. For example, identifier request may be sent/received via the wireless communication path 110, 112. Blocks 502 and 504 may be optional because robotic vehicles may not need to be interrogated to send identifiers, and in some embodiments robotic vehicles may continually or periodically transmit their respective identifiers automatically.

In block 506, the robotic vehicle processor may send the identifier of the robotic vehicle. This identifier may be a unique ID to the robotic vehicle, such as a tail number, media access control (MAC) address, identification friend or foe (IFF) code, or other ID and may include or be associated with a SSL certificate, TLS certificate, or other cryptographic token. For example, identifier may be sent via the wireless communication path 110, 112.

In block 508, the observer's computing device processor may receive the identifier of the robotic vehicle.

In determination block 509, the observer's computing device processor may determine whether the identifier is valid. For example, the observer's computing device processor may compare the identifier to known valid identifiers or other validation information (e.g., generate a hash value with a token and compare that to a known good hash, etc.).

In response to determining that the identifier is not valid (i.e., determination block 509="No"), the processor may indicate an error in block 510.

In response to validating the identifier (i.e., determination block 509="Yes"), the observer's computing device processor and robotic vehicle processors may establish a radio link with one another in blocks 511 and 512 and execute operations of the method 300 in block 301 and 304, respectively, as described.

Figure 6A:
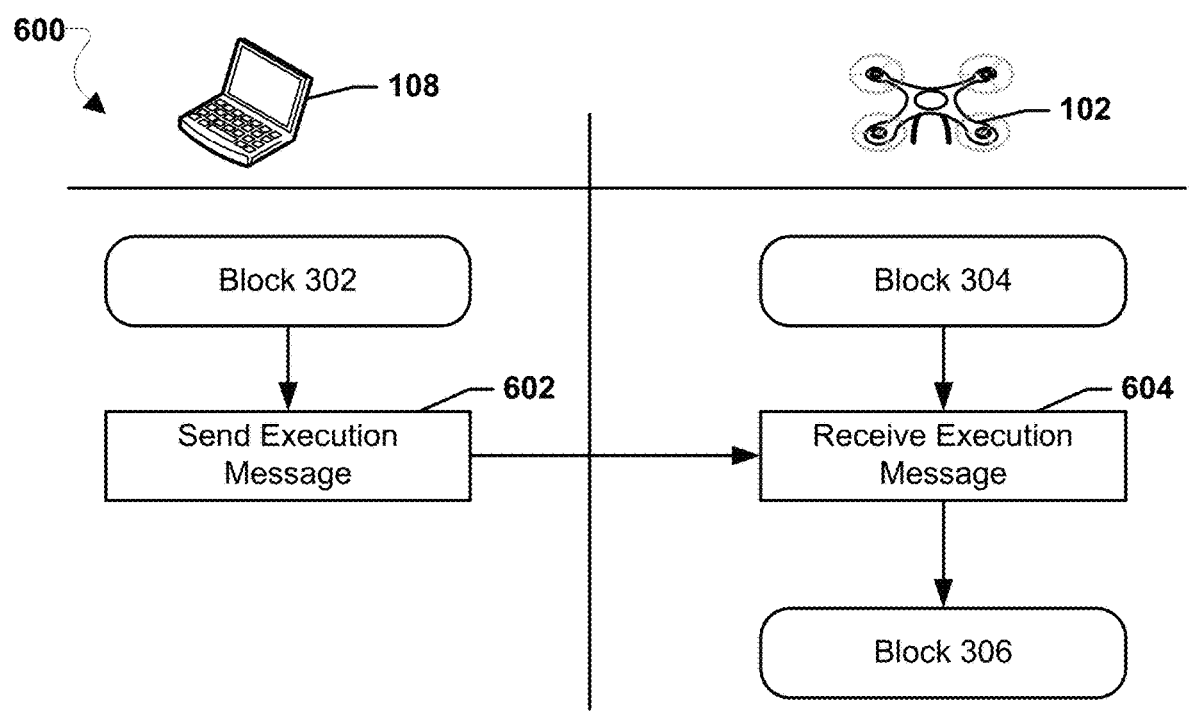
FIG. 6A is a process flow diagram illustrating a method for disambiguating a robotic vehicle according to some embodiments.

FIG. 6A illustrates a method for disambiguating a robotic vehicle according to some embodiments. With reference to FIGS. 1-6A, the method 600 may be implemented in hardware components and/or software components of an observer's computing device (e.g., observer's computing device 108) and/or the robotic vehicle (e.g., 102, 104, 200), the operation of which may be controlled by one or more processors (e.g., the processor 220 and/or the like) of the robotic vehicle and/or observer's computing device. In some embodiments, the operations of the method 600 may be performed in conjunction with the operations of the methods 300, 350, and/or 500. In some embodiments, the operations of the method 600 may be performed subsequent to the operations of blocks 302 and 304.

In block 602, the processor of the observer's computing device may send an execution message, and in block 604 the processor of the robotic vehicle may receive the execution message. In some embodiments, disambiguation message may indicate that the execution of the identifying/distinguishing task or maneuver is to be delayed until an execution message is received. The execution message may be a message from the observer's computing device indicating that the identifying/distinguishing task or maneuver should be executed. In this manner, the observer may state the action to perform and that the robotic vehicle/robotic vehicle operator should be prepared to receive a follow-up notification at a certain time or within a window at which the action is to be performed. For example, the disambiguation message may be a request that a LED should be flashed in response to the execution message. The observer's computing device may send the execution message as the next follow-up notification and the robotic vehicle may execute the identifying/distinguishing task or maneuver in response to receiving the execution message (e.g., flash the LED). The identification window may begin upon the receipt of the execution message or the execution message may indicate the identification window of time.

Figure 6B:
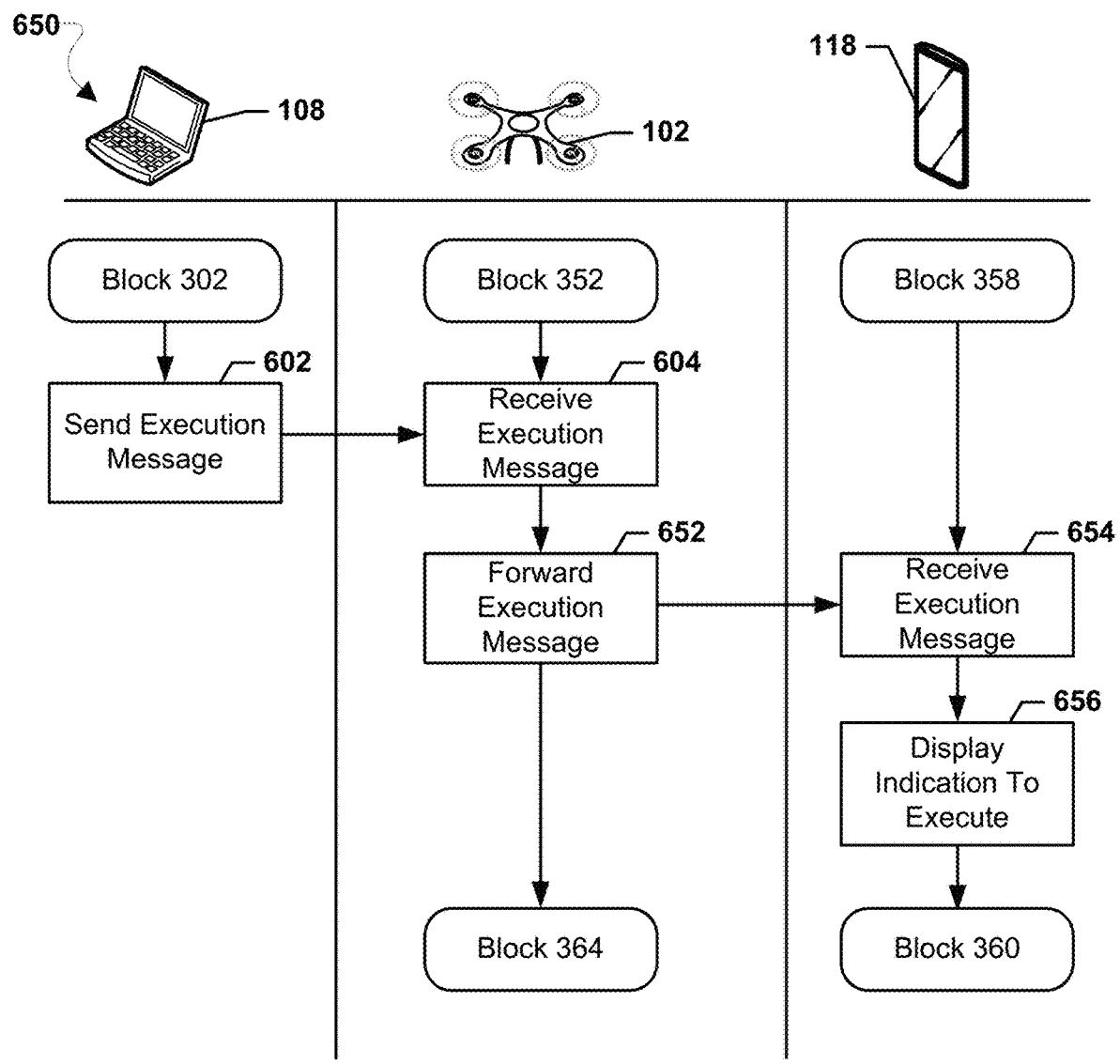
FIG. 6B is a process flow diagram illustrating a method for disambiguating a robotic vehicle according to some embodiments.

FIG. 6B illustrates a method for disambiguating a robotic vehicle according to some embodiments. With reference to FIGS. 1-6B, the method 650 may be implemented in hardware components and/or software components of an observer's computing device (e.g., observer's computing device 108), the robotic vehicle (e.g., 102, 104, 200), and/or an operator's computing device (e.g., operator's computing device 118, 124), the operation of which may be controlled by one or more processors (e.g., the processor 220 and/or the like) of the robotic vehicle, observer's computing device, and/or operator's computing device. In some embodiments, the operations of the method 650 may be performed in conjunction with the operations of the methods 300, 350, 500, and/or 600. In some embodiments, the operations of the method 650 may be performed subsequent to the operations of blocks 302, 352, and 358.

In block 602, the processor of the observer's computing device may send an execution message, and in block 604 the processor of the robotic vehicle may receive the execution message.

In block 652, the processor of the robotic vehicle may forward the execution message to the operator's computing device, and in block 654 the operator's computing device processor may receive the execution message.

In block 656, the operator's computing device may display an indication to execute. In this manner, the operator may be notified to execute the identifying/distinguishing task or maneuver. In some embodiments, the disambiguation message may indicate that the execution of the identifying/distinguishing task or maneuver is to be delayed until an execution message is received. The execution message may be a message from the observer's computing device indicating that the identifying/distinguishing task or maneuver should be executed. In this manner, the observer may state the action to perform and that the robotic vehicle/robotic vehicle operator should be prepared to receive a follow-up notification at a certain time or within a window of time at which the action is to be performed. For example, the disambiguation message may be a request that a LED should be flashed in response to the execution message. The observer's computing device may send the execution message as the next follow-up notification and the robotic vehicle operator may execute the identifying/distinguishing task or maneuver in response to receiving the execution message (e.g., flash the LED). The identification window may begin upon the receipt of the execution message or the execution message may indicate the identification window of time.

Figure 7:
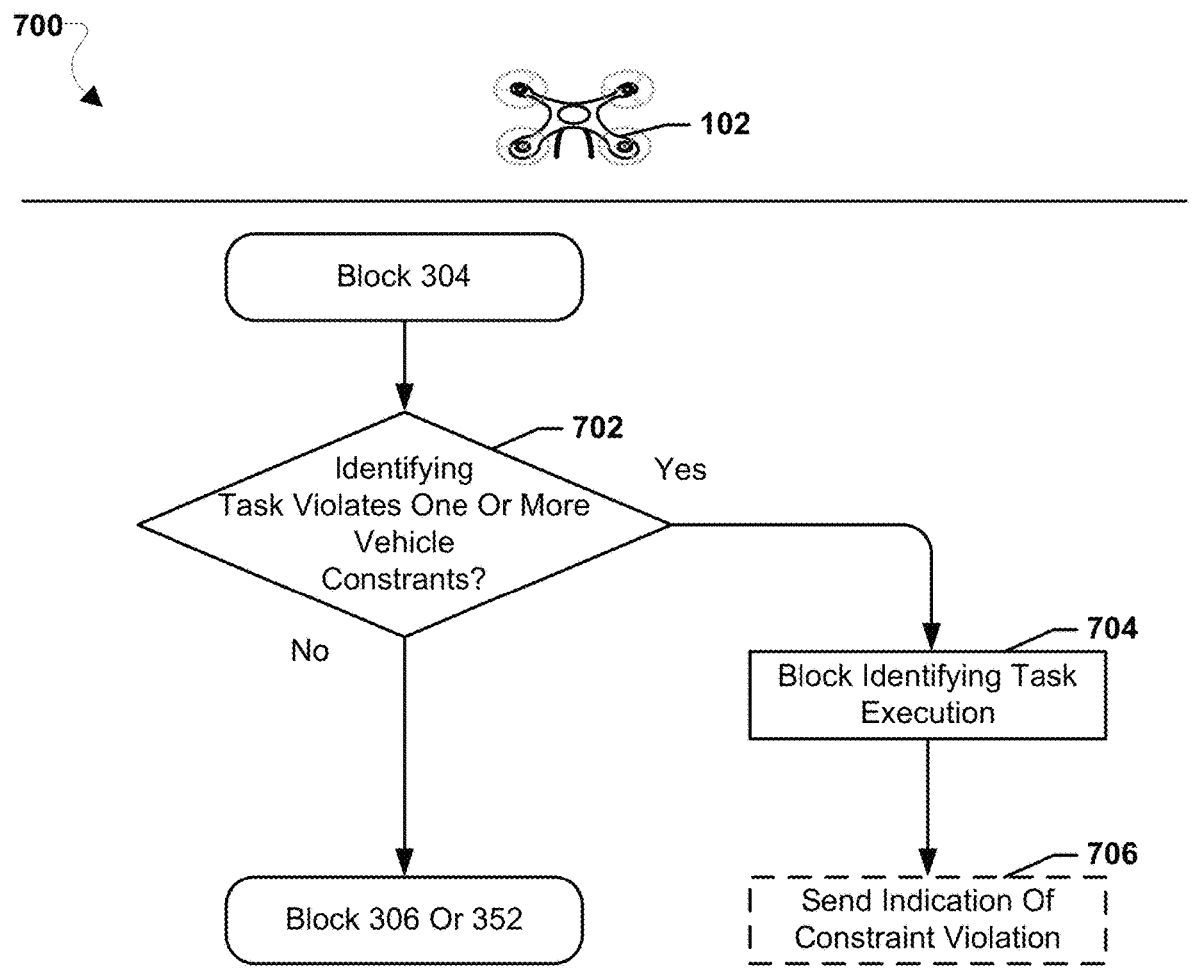
FIG. 7 is a process flow diagram illustrating a method for verifying an identifying/distinguishing task or maneuver according to some embodiments.

FIG. 7 illustrates a method 700 for verifying an identifying/distinguishing task or maneuver according to some embodiments. With reference to FIGS. 1-7, the method 700 may be implemented in hardware components and/or software components of the robotic vehicle (e.g., 102, 104, 200), the operation of which may be controlled by one or more processors (e.g., the processor 220 and/or the like) of the robotic vehicle. In some embodiments, the operations of the method 700 may be performed in conjunction with the operations of the methods 300, 350, 500, 600, and/or 650. In some embodiments, the operations of the method 700 may be performed subsequent to the operations of block 304 of the method 300.

In determination block 702, the processor may identify whether an identifying/distinguishing task or maneuver violates one or more vehicle constraints. Vehicle constraints may be limitations on the operations that a robotic vehicle may perform within structural, aerodynamic, safety, or other limits. For example, vehicle constraints may be associated with the design of the vehicle (e.g., the vehicle aerodynamics may not support certain maneuvers, the vehicle may lack lights, a maneuver would overstress the vehicle or some component, etc.). As another example, vehicle constraints may be associate with the mission of the robotic vehicle (e.g., the robotic vehicle may be a military vehicle that should not turn on its lights during a mission, the robotic vehicle may be carrying a heavy and/or delicate payload limiting its maneuverability, etc.) As a further example, vehicle constraints may be associated with safety considerations (e.g., speed limits, maximum or minimum altitude restrictions, etc.)

In response to determining that the identifying/distinguishing task or maneuver does not violate one or more vehicle constraints (i.e., determination block 702="No"), the processor of the robotic vehicle may perform operations of the method 300 in blocks 306 or 352-368 to execute the task.

In response to determining that the identifying/distinguishing task or maneuver violates one or more vehicle constraints (i.e., determination block 702="Yes"), the processor of the robotic vehicle may block the execution of the identifying/distinguishing task or maneuver in block 704. For example, the processor may ignore or drop the disambiguation message and/or the processor may not pass the identifying/distinguishing task or maneuver to an avionics module. In some embodiments, in response to blocking the identifying/distinguishing task or maneuver execution, the processor may send an indication of the constraint violation to the observer's computing device in block 706. As examples, the indication may be a message indicating that the robotic vehicle is on a military mission, cannot perform a barrel roll, is prohibit from flying below or above an altitude restriction, etc.

Figure 8A:
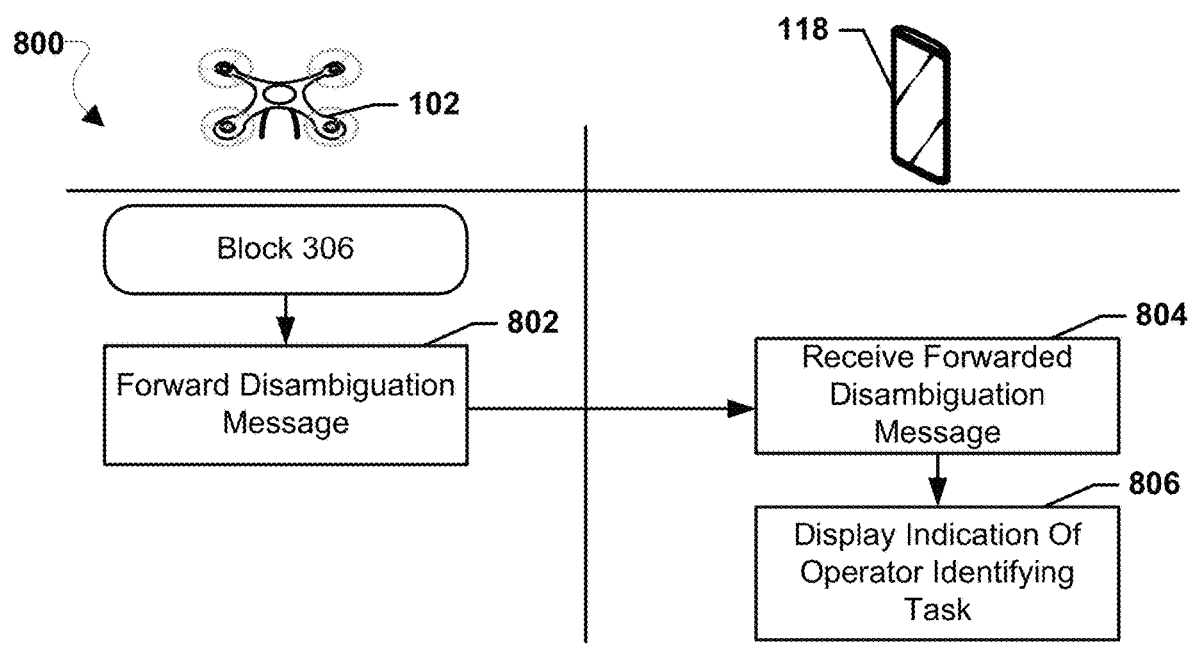
FIG. 8A is a process flow diagram illustrating a method for disambiguating a robotic vehicle operator according to some embodiments.

FIG. 8A illustrates a method 800 for disambiguating a robotic vehicle operator according to some embodiments. With reference to FIGS. 1-8A, the method 800 may be implemented in hardware components and/or software components of an observer's computing device (e.g., observer's computing device 108), the robotic vehicle (e.g., 102, 104, 200), and/or an operator's computing device (e.g., operator's computing device 118, 124), the operation of which may be controlled by one or more processors (e.g., the processor 220 and/or the like) of the robotic vehicle, observer's computing device, and/or operator's computing device. In some embodiments, the operations of the method 800 may be performed in conjunction with the operations of the methods 300, 350, 500, 600, 650, and/or 700. In some embodiments, the operations of the method 800 may be performed subsequent to the operations of blocks 306 of the method 300.

In block 802, the robotic vehicle processor may forward the disambiguation message to the operator's computing device. In block 804, the operator's computing device may receive the disambiguation message. In some embodiments, a disambiguation message may include an operator identifying task. An operator identifying task may be an indication of an action that an operator of a robotic vehicle should take to identify him or herself visually. For example, an operator identifying task may be an indication to an operator of a robotic vehicle to wave his or her arm in the air, turn around, or make some other type of motion/gesture.

In response to receiving the disambiguation message including an operator identifying task, the processor of the operator's computing device may display an indication of the operator identifying task in block 806. As examples, the processor may control a display or speaker of the operator's computing device to output a message of "wave your arm above your head." The observer may look for an operator waving his or her arm above his or her head to differentiate the operator associated with the robotic vehicle receiving the disambiguation message from other operators and individuals.

Figure 8B:
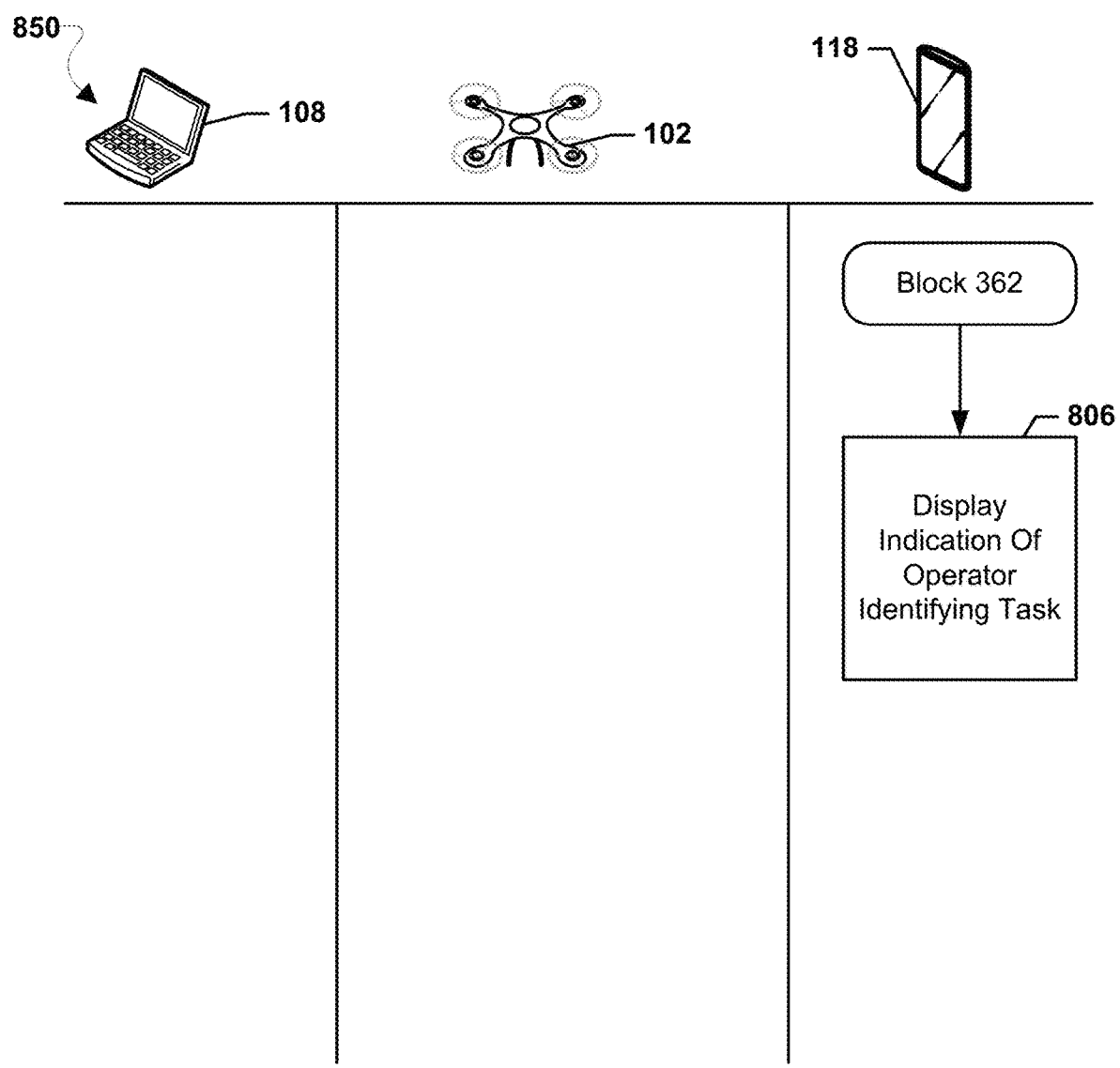
FIG. 8B is a process flow diagram illustrating a method for disambiguating a robotic vehicle operator according to some embodiments.

FIG. 8B illustrates a method 850 for disambiguating a robotic vehicle operator according to some embodiments. With reference to FIGS. 1-8B, the method 850 may be implemented in hardware components and/or software components of an observer's computing device (e.g., observer's computing device 108), the robotic vehicle (e.g., 102, 104, 200), and/or an operator's computing device (e.g., operator's computing device 118, 124), the operation of which may be controlled by one or more processors (e.g., the processor 220 and/or the like) of the robotic vehicle, observer's computing device, and/or operator's computing device. In some embodiments, the operations of the method 800 may be performed in conjunction with the operations of the methods 300, 350, 500, 600, 650, 700, and/or 800. In some embodiments, the operations of the method 850 may be performed subsequent to the operations of blocks 362 of the method 300. In block 806, the processor of the operator's computing device may perform like operation of like numbered block of the method 800.

Figure 9:
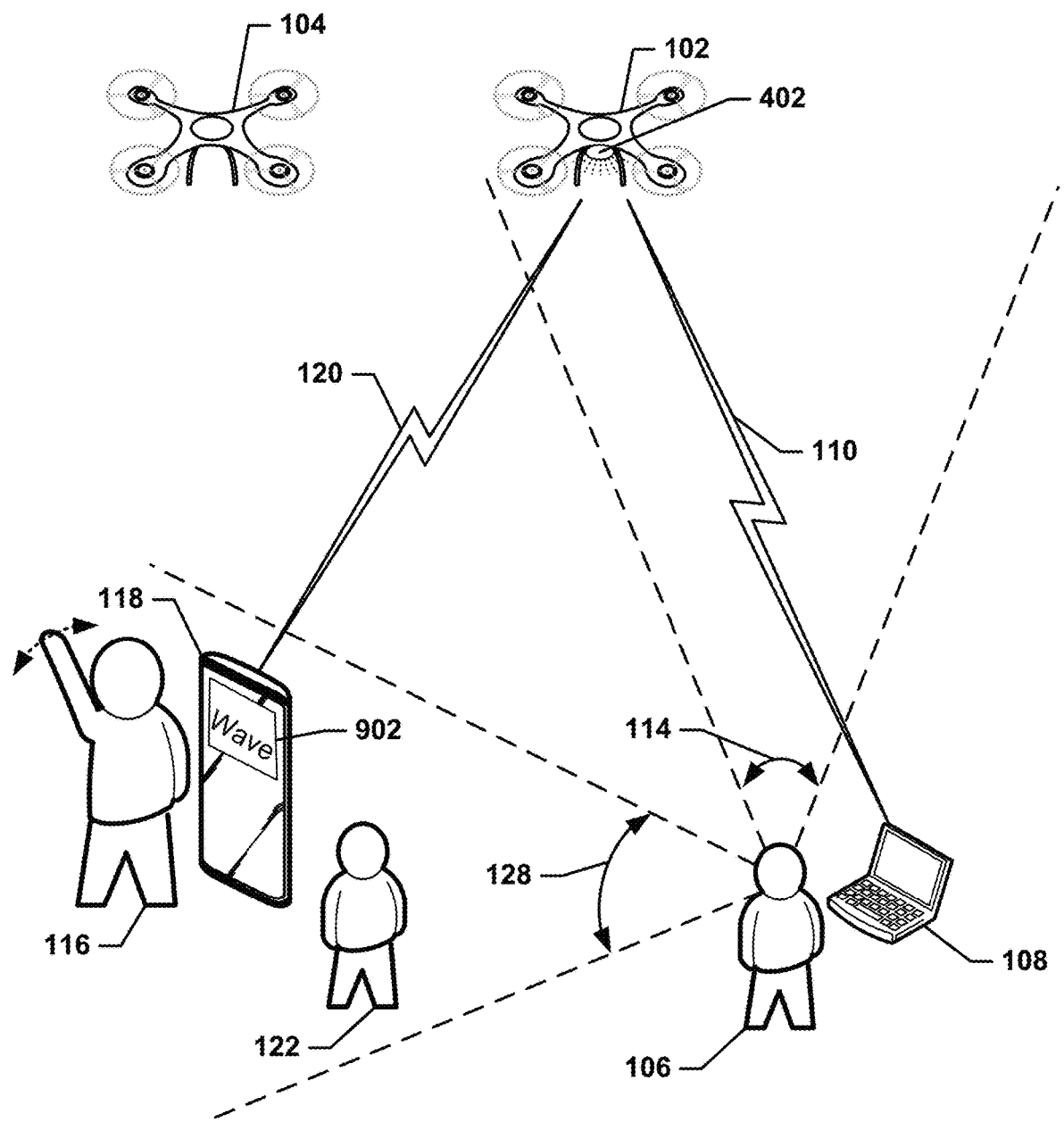
FIG. 9 is a system block diagram illustrating an example of a robotic vehicle operator being identified according to some embodiments.

FIG. 9 illustrates an example of a robotic vehicle operator being identified according to an embodiment. With reference to FIGS. 1-9, the operator identification may be performed according to operations of the methods 800 and/or 850. For example, the disambiguation message from the observer's computing device 108 may result in the operator's computing device 118 displaying a message 902, such as "Wave". The operator 116 may wave his or her arm as illustrated such that the observer 106 may determine that operator 116 is associated with robotic vehicle 102, rather than operator 122 who may be controlling another robotic vehicle 104.

Figure 10:
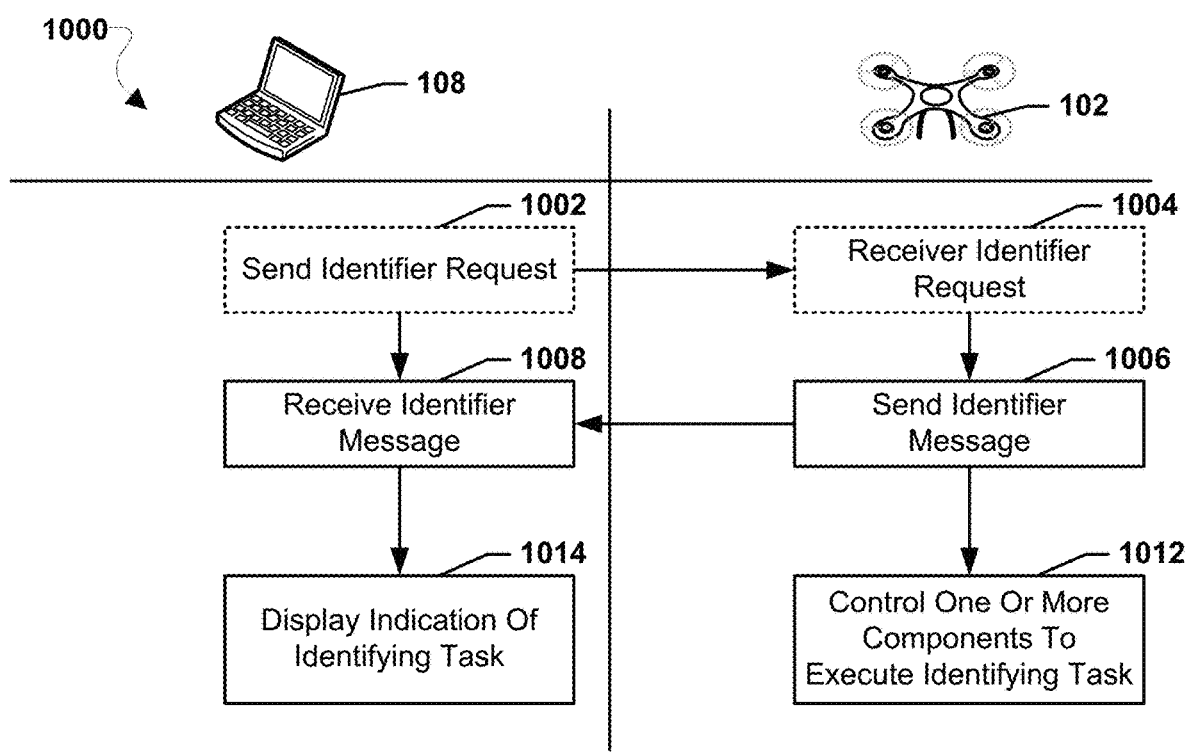
FIG. 10 is a process flow diagram illustrating a method for disambiguating a robotic vehicle according to some embodiments.

FIG. 10 illustrates a method for disambiguating a robotic vehicle according to some embodiments. With reference to FIGS. 1-10, the method 1000 may be implemented in hardware components and/or software components of an observer's computing device (e.g., observer's computing device 108) and/or the robotic vehicle (e.g., 102, 104, 200), the operation of which may be controlled by one or more processors (e.g., the processor 220 and/or the like) of the robotic vehicle and/or operator's computing device (e.g., 118, 124).

In optional block 1002, the observer's computing device processor may send an identifier request. An identifier request may be a message requesting a robotic vehicle receiving the message send an identifier of the robotic vehicle. In optional block 1004, the robotic vehicle processor may receive the identifier request. For example, identifier request may be sent/received via the wireless communication path 110, 112. Blocks 1002 and 1004 may be optional because robotic vehicles may not need to be interrogated to send identifiers, and in some embodiments robotic vehicles may continually or periodically transmit their respective identifiers automatically.

In block 1006, the robotic vehicle processor may send an identifier message. In some embodiments, a robotic vehicle may generate an identifier message indicating an identifying/distinguishing task or maneuver the robotic vehicle is going to execute within an identification window or is already executing. The identifier message may be periodically sent by the robotic vehicle or may be sent in response to the robotic vehicle receiving an identifier request. The identifier message may also include the identifier of the robotic vehicle. This identifier may be a unique ID to the robotic vehicle, such as a tail number, media access control (MAC) address, identification friend or foe (IFF) code, or other ID and may include or be associated with a SSL certificate, TLS certificate, or other cryptographic token. For example, identifier message may be sent via the wireless communication path 110, 112.

In block 1012, the processor of the robotic vehicle may control one or more components to execute the identifying/distinguishing task or maneuver. Executing the identifying/distinguishing task or maneuver may be performed in a similar manner as described with reference to block 306 of the method 300.

In block 1008, the observer's computing device processor may receive the identifier message. In block 1014, the processor of the observer's computing device may display an indication of the identifying/distinguishing task or maneuver. In this manner, identifying/distinguishing task or maneuvers may be executed and indicated to observers without needing a disambiguation message to be sent by the observer.

Figure 11:
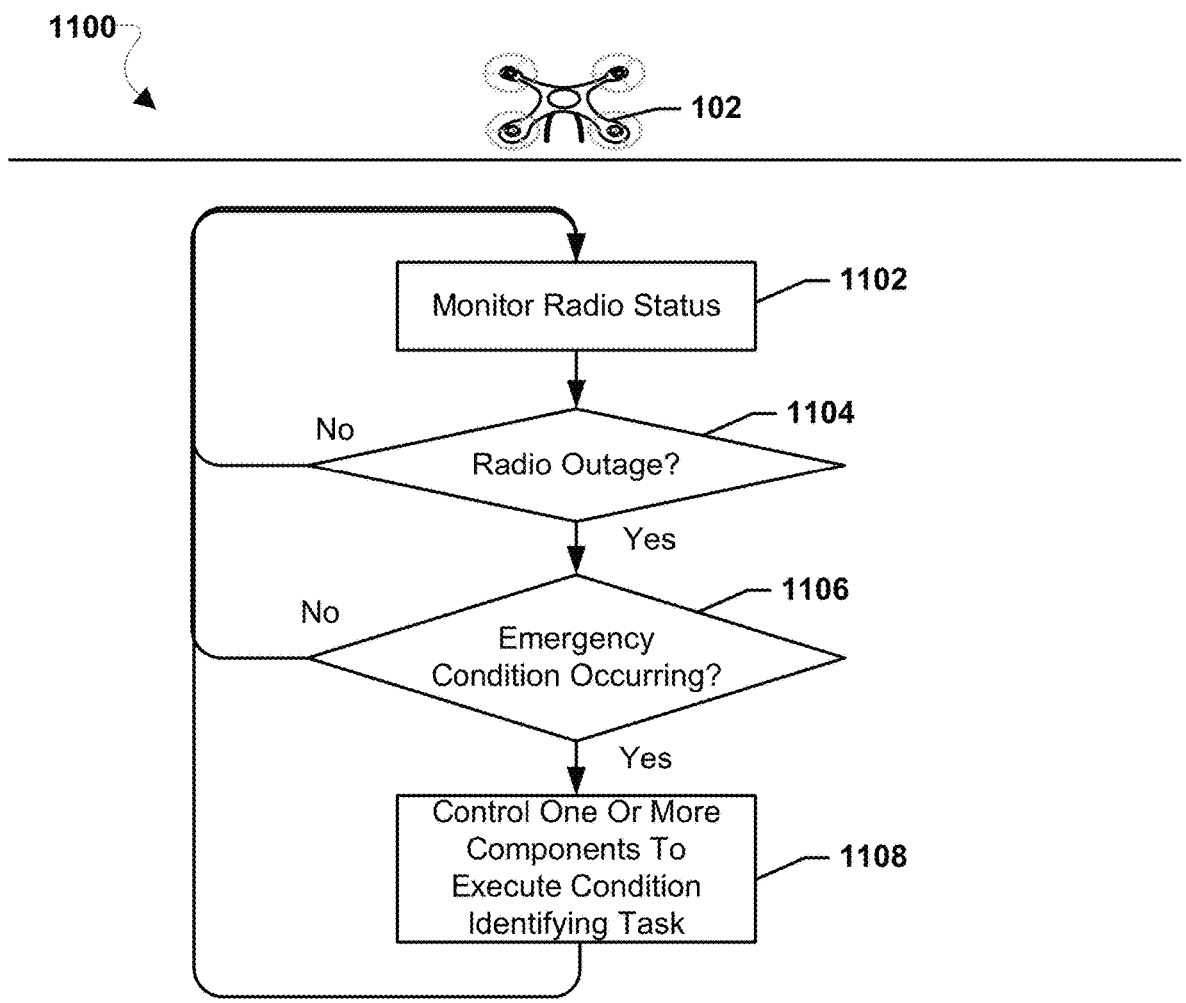
FIG. 11 is a process flow diagram illustrating a method for robotic vehicle emergency condition signaling according to some embodiments.
Figure 12:
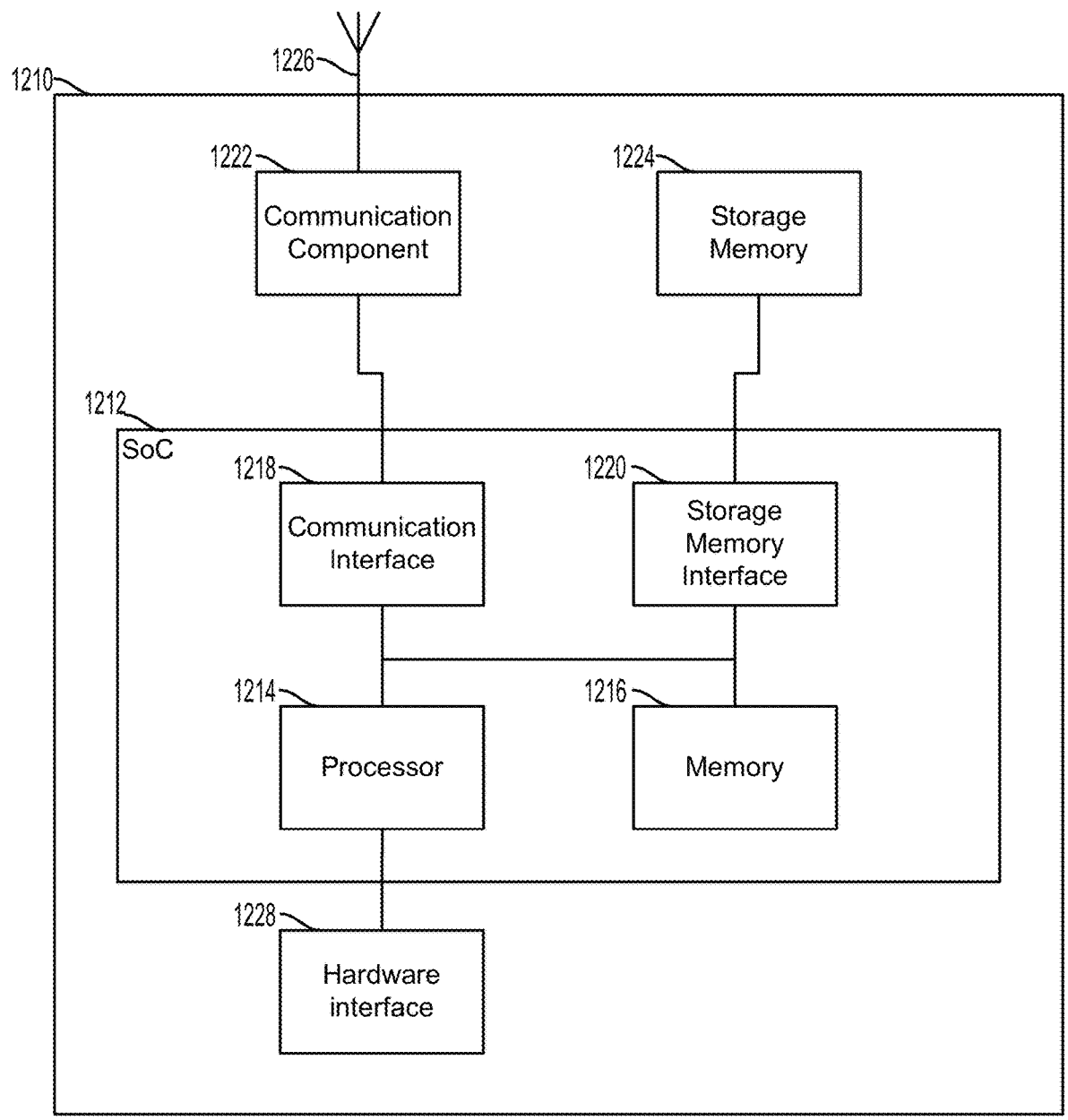
FIG. 12 is a component block diagram illustrating a processing device suitable for implementing various embodiments.

FIG. 11 illustrates a method for robotic vehicle emergency condition signaling according to some embodiments. With reference to FIGS. 1-11, the method 1100 may be implemented in hardware components and/or software components of a robotic vehicle (e.g., 102, 104, 200), the operation of which may be controlled by one or more processors (e.g., the processor 220 and/or the like) of the robotic vehicle. In some embodiments, the operations of the method 1100 may be performed in conjunction with the operations of the methods 300, 350, 500, 600, 650, 700, 800, 850, and/or 1000.

In block 1102, the processor may monitor the radio status. For example, the processor of the robotic vehicle may determine whether the radio is functioning properly. In determination block 1104, the processor may determine whether there is a radio outage. In response to determining that no radio outage exists (i.e., determination block 1104="No"), the processor may continue to monitor the radio communication link in block 1102.

In response to detecting a radio outage (i.e., determination block 1104="Yes"), the processor may determine whether an emergency condition is occurring in determination block 1106. Example, emergency conditions may include loss of GPS, motor failure, the radio outage itself, etc.). In response to determining that no emergency condition is occurring (i.e., determination block 1106="No"), the processor may continue to monitor the radio link status in block 1102.

In response to determining that an emergency condition is occurring (i.e., determination block 1106="Yes"), the processor of the robotic vehicle may control one or more components to execute a condition identifying/distinguishing task or maneuver in block 1108. The condition identifying/distinguishing task or maneuver may be a predetermined task or maneuver to indicate the radio outage and/or emergency condition to an observer. For example, when a radio outage has occurred and GPS is lost, the robotic vehicle may execute a predetermined identifying/distinguishing task or maneuver to flash a LED red once every three seconds. An observer or operator may see that flashing red LED at the three second interval and determine the robotic vehicle has experience a radio outage and GPS loss. The observer or operator may then take appropriate action for the indicated emergency condition even though the emergency condition could not be communicated via radio due to the radio outage. Executing the condition identifying/distinguishing task or maneuver may be performed in a similar manner as described with reference to block 306 of FIG. 3A.

Various embodiments (including, but not limited to, embodiments discussed with reference to FIGS. 1-11) may be implemented within a processing device 1210 configured to be used in a robotic vehicle (e.g., robotic vehicles 102, 104). As such, the processing device 1210 may implement the methods 300, 350, 500, 600, 650, 700, 800, 850, 1000, 1100 in FIGS. 3A, 3B, 5, 6A, 6B, 7, 8A, 8B, 10, and 11. A processing device may be configured as or including a system-on-chip (SOC) 1212, an example of which is illustrated FIG. 12. With reference to FIGS. 1-12, the SOC 1212 may include (but is not limited to) a processor 1214, a memory 1216, a communication interface 1218, and a storage memory interface 1220. The processing device 1210 or the SOC 1212 may further include a communication component 1222, such as a wired or wireless modem, a storage memory 1224, an antenna 1226 for establishing a wireless communication link, and/or the like. The processing device 1210 or the SOC 1212 may further include a hardware interface 1228 configured to enable the processor 1214 to communicate with and control various components of a robotic vehicle. The processor 1214 may include any of a variety of processing devices, for example any number of processor cores.

The term "system-on-chip" or SOC is used herein to refer to a set of interconnected electronic circuits typically, but not exclusively, including one or more processors (e.g., 1214), a memory (e.g., 1216), and a communication interface (e.g., 1218). The SOC 1212 may include a variety of different types of processors 1214 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 1212 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 1212 may include one or more processors 1214. The processing device 1210 may include more than one SoC 1212, thereby increasing the number of processors 1214 and processor cores. The processing device 1210 may also include processors 1214 that are not associated with an SoC 1212 (i.e., external to the SoC 1212). Individual processors 1214 may be multicore processors. The processors 1214 may each be configured for specific purposes that may be the same as or different from other processors 1214 of the processing device 1210 or SOC 1212. One or more of the processors 1214 and processor cores of the same or different configurations may be grouped together. A group of processors 1214 or processor cores may be referred to as a multi-processor cluster.

The memory 1216 of the SoC 1212 may be a volatile or non-volatile memory configured for storing data and processor-executable instructions for access by the processor 1214. The processing device 1210 and/or SoC 1212 may include one or more memories 1216 configured for various purposes. One or more memories 1216 may include volatile memories such as random access memory (RAM) or main memory, or cache memory.

Some or all of the components of the processing device 1210 and the SOC 1212 may be arranged differently and/or combined while still serving the functions of the various aspects. The processing device 1210 and the SOC 1212 may not be limited to one of each of the components, and multiple instances of each component may be included in various configurations of the processing device 1210

Figure 13:
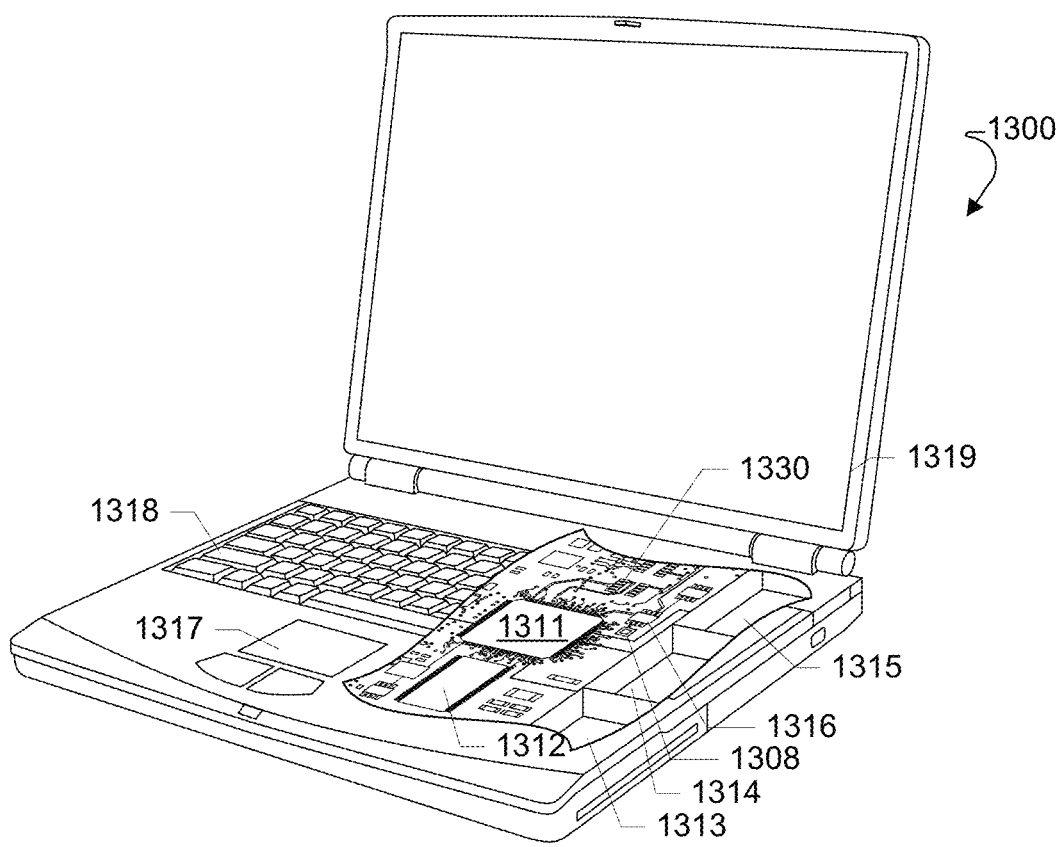
FIG. 13 is a component diagram of an example computing device suitable for use with various embodiments.

The various embodiments (including, but not limited to, embodiments discussed with reference to FIGS. 1-11) may be implemented in a wide variety of computing devices include a laptop computer 1300 an example of which is illustrated in FIG. 13. As such, the laptop computer 1300 may implement the methods 300, 350, 500, 600, 650, 700, 800, 850, 1000, 1100 in FIGS. 3A, 3B, 5, 6A, 6B, 7, 8A, 8B, 10, and 11. Many laptop computers include a touchpad touch surface 1317 that serves as the computing device's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory.

The laptop computer 1300 may also include one or more hardware components 1330 coupled to the processor 1311 and configured to perform functions and operations of the various embodiments. Additionally, the laptop computer 1300 may have one or more antenna 1308 for sending and receiving electromagnetic radiation that may be connected to a wireless transceiver 1316 (e.g., a wireless data link transceiver (such as a Bluetooth®, Wi-Fi®, or any other type wireless data link transceiver, etc.), cellular network transceiver (such as a CDMA, TDMA, GSM, 3G, 4G, LTE, or any other type of cellular network transceiver), etc.) coupled to the processor 1311. The laptop computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a Universal Serial Bus (USB) input) as are well known, which may also be used in conjunction with the various embodiments.

Figure 14:
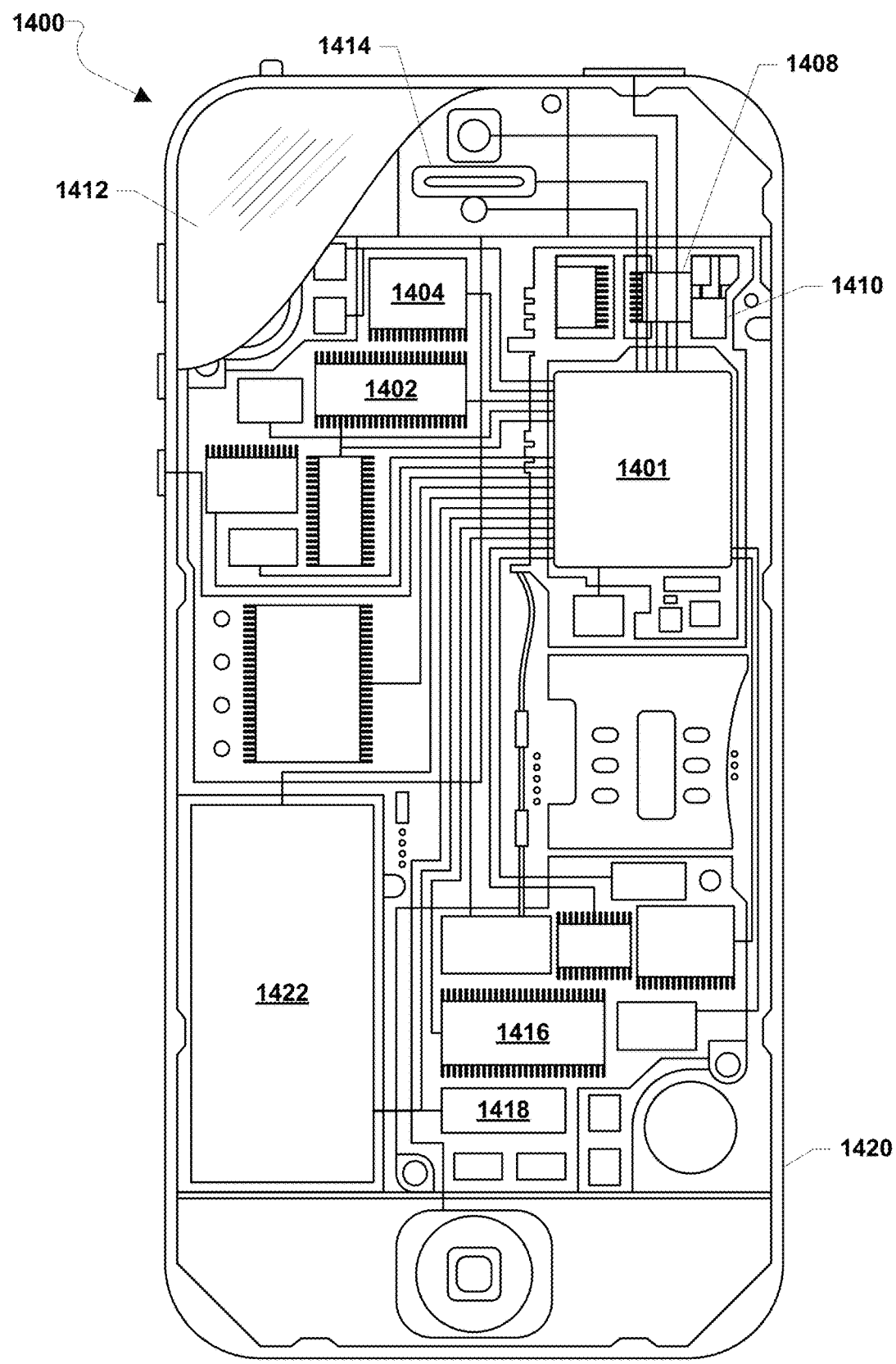
FIG. 14 is a component diagram of another example computing device suitable for use with various embodiments.

The various embodiments (including, but not limited to, embodiments discussed above with reference to FIGS. 1-11) may be implemented in any of a variety of the computing devices including a mobile device 1400, an example of which is illustrated in FIG. 14. As such, the mobile device 1400 may implement the methods 300, 350, 500, 600, 650, 700, 800, 850, 1000, 1100 in FIGS. 3A, 3B, 5, 6A, 6B, 7, 8A, 8B, 10, and 11. For example, the mobile device 1400 may include a processor 1401 coupled to a touch screen controller 1404 and an internal memory 1402. The processor 1401 may be one or more multicore integrated circuits (ICs) designated for general or specific processing tasks. The internal memory 1402 may be volatile or non-volatile memory, and may also be secure and/or encrypted memory, or unsecure and/or unencrypted memory, or any combination thereof. The touch screen controller 1404 and the processor 1401 may also be coupled to a touch screen panel 1412, such as a resistive-sensing touch screen, capacitive-sensing touch screen, infrared sensing touch screen, etc. The mobile device 1400 may have one or more radio signal transceivers 1408 (e.g., Peanut®, Bluetooth®, Zigbee®, Wi-Fi, RF, cellular, etc.) and antennae 1410, for sending and receiving, coupled to each other and/or to the processor 1401. The transceivers 1408 and antennae 1410 may be used with the above-mentioned circuitry to implement various wireless transmission protocol stacks and interfaces and to establish the various wireless links discussed herein. The mobile device 1400 may include one or more cellular network wireless modem chips 1416, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 1401. The one or more cellular network wireless modem chips 1416 may enable the mobile device 1400 to receive services from one or more cellular networks (e.g., CDMA, TDMA, GSM, 3G, 4G, LTE, or any other type of cellular network), to implement various wireless transmission protocol stacks and interfaces, and to establish the various wireless links discussed herein.

The mobile device 1400 may include a peripheral device connection interface 1418 coupled to the processor 1401. The peripheral device connection interface 1418 may be singularly configured to accept one type of connection, or multiply configured to accept various types of physical and communication connections, common or proprietary, such as USB, FireWire, Thunderbolt, Ethernet, or PCIe. The peripheral device connection interface 1418 may also be coupled to a similarly configured peripheral device connection port (not shown). The mobile device 1400 may also include speakers 1414 for providing audio outputs.

The mobile device 1400 may also include a housing 1420, constructed of a plastic, metal, or a combination of materials, for containing all or some of the components discussed herein. The mobile device 1400 may include a power source 1422 coupled to the processor 1401, such as a disposable or rechargeable battery. The rechargeable battery may also be coupled to the peripheral device connection port to receive a charging current from a source external to the mobile device 1400.

The processors 220, 1214, 1311, 1401 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 220, 1214, 1311, 1401. The processors 220, 1214, 1311, 1401 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 220, 1214, 1311, 1401 including internal memory or removable memory plugged into the device and memory within the processors 220, 1214, 1311, 1401 themselves.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 350, 500, 600, 650, 700, 800, 850, 1000, and 1100 may be substituted for or combined with one or more operations of the methods 300, 350, 500, 600, 650, 700, 800, 850, 1000, and 1100, and vice versa.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then,"

"next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments described herein but are to be accorded the widest scope consistent with the following claims and the principles and novel features disclosed herein.

What is claimed is:

1. A method of disambiguating a robotic vehicle, comprising:
    sending, by a processor of the robotic vehicle, a unique identifier of the robotic vehicle to an observer's computing device in response to an identifier request received from the observer's computing device, wherein the unique identifier is sent while the robotic vehicle is operating at least in part under control of an operator's computing device that is different from the observer's computing device;
    receiving, in the processor of the robotic vehicle, a disambiguation message from the observer's computing device including the unique identifier of the robotic vehicle; and
    controlling, by a processor of the robotic vehicle, one or more components of the robotic vehicle to execute an identifying/distinguishing task or maneuver in response to receiving the disambiguation message.

2. The method of claim 1, wherein controlling one or more components of the robotic vehicle to execute the identifying/distinguishing task or maneuver is performed within an identification window of time.

3. The method of claim 1, further comprising:
    forwarding the disambiguation message from the processor of the robotic vehicle to the operator's computing device; and
    receiving an instruction to execute the identifying/distinguishing task or maneuver from the operator's computing device.

4. The method of claim 3, further comprising:
    establishing a radio link between the robotic vehicle and the observer's computing device prior to receiving the disambiguation message.

5. The method of claim 1, wherein the disambiguation message is received in response to the unique identifier of the robotic vehicle being validated.

6. The method of claim 1, wherein the disambiguation message includes an operator identifying task.

7. The method of claim 6, wherein the operator identifying task is a gesture or motion of an operator to be performed.

8. The method of claim 1, further comprising receiving an execution message prior to executing the identifying/distinguishing task or maneuver.

9. The method of claim 1, further comprising:
    determining whether an identifying/distinguishing task or maneuver violates one or more vehicle constraints; and
    blocking execution of the identifying/distinguishing task or maneuver in response to determining that the identifying/distinguishing task or maneuver violates one or more vehicle constraints.

10. The method of claim 1, wherein the identifying/distinguishing task or maneuver is one action or a series of actions.

11. The method of claim 10, wherein the one action or series of actions are one or more of performing a maneuver, controlling a visual indicator, generating an audible indicator, and sending data.

12. The method of claim 11, wherein controlling the visual indicator comprises activating or changing a light emitting device of the robotic vehicle.

13. A method of disambiguating a robotic vehicle, comprising:
receiving, in a processor of a robotic vehicle, a disambiguation message from an observer's computing device, wherein the observer's computing device is different from an operator's computing device for controlling the robotic vehicle and wherein the disambiguation message includes a unique identifier of the robotic vehicle;
sending, from the processor of the robotic vehicle, the disambiguation message to the operator's computing device in response to receiving the disambiguation message; and
controlling, by the processor of the robotic vehicle, one or more components of the robotic vehicle to execute an identifying/distinguishing task or maneuver based at least in part on the disambiguation message.

14. The method of claim 13, further comprising:
determining whether an emergency condition of the robotic vehicle is occurring; and
controlling, by the processor of the robotic vehicle, one or more components of the robotic vehicle to execute a second identifying/distinguishing task or maneuver in response to determining that the emergency condition of the robotic vehicle is occurring.

15. The method of claim 13, wherein the identifying/distinguishing task or maneuver is one action or a series of actions.

16. The method of claim 15, wherein the one action or series of actions are one or more of performing a maneuver, controlling a visual indicator, generating an audible indicator, and sending data.

17. The method of claim 16, wherein controlling the visual indicator comprises activating or changing a light emitting device of the robotic vehicle.

18. A robotic vehicle, comprising:
a processor configured with processor-executable instructions to:
send a unique identifier of the robotic vehicle to an observer's computing device in response to an identifier request received from the observer's computing device, wherein the unique identifier is sent while the robotic vehicle is operating at least in part under control of an operator's computing device that is different from the observer's computing device;
receive a disambiguation message from the observer's computing device including the unique identifier of the robotic vehicle, and
control one or more components of the robotic vehicle to execute an identifying/distinguishing task or maneuver in response to receiving the disambiguation message.

19. The robotic vehicle of claim 18, wherein the processor is further configured with processor-executable instructions such that controlling one or more components of the robotic vehicle to execute the identifying/distinguishing task or maneuver is performed within an identification window of time.

20. The robotic vehicle of claim 18, wherein the processor is further configured with processor-executable instructions to:
forward the disambiguation message to the operator's computing device; and
receive an instruction to execute the identifying/distinguishing task or maneuver from the operator's computing device.

21. The robotic vehicle of claim 20, wherein the processor is further configured with processor-executable instructions to:
establish a radio link between the robotic vehicle and the observer's computing device prior to receiving the disambiguation message.

22. The robotic vehicle of claim 18, wherein the processor is further configured with processor-executable instructions such that the disambiguation message is received in response to the unique identifier of the robotic vehicle being validated.

23. The robotic vehicle of claim 18, wherein the processor is further configured with processor-executable instructions such that the disambiguation message includes an operator identifying task.

24. The robotic vehicle of claim 23, wherein the processor is further configured with processor-executable instructions such that the operator identifying task is a gesture or motion of an operator to be performed.

25. The robotic vehicle of claim 18, wherein the processor is further configured with processor-executable instructions to receive an execution message prior to executing the identifying/distinguishing task or maneuver.

26. The robotic vehicle of claim 18, wherein the processor is further configured with processor-executable instructions to:
determine whether an identifying/distinguishing task or maneuver violates one or more vehicle constraints; and
block execution of the identifying/distinguishing task or maneuver in response to determining that the identifying/distinguishing task or maneuver violates one or more vehicle constraints.

27. The robotic vehicle of claim 18, wherein the processor is further configured with processor-executable instructions such that the identifying/distinguishing task or maneuver is one action or a series of actions.

28. The robotic vehicle of claim 27, wherein the processor is further configured with processor-executable instructions such that the one action or series of actions are one or more of performing a maneuver, controlling a visual indicator, generating an audible indicator, and sending data.

29. The robotic vehicle of claim 28, wherein the processor is further configured with processor-executable instructions such that controlling the visual indicator comprises activating or changing a light emitting device of the robotic vehicle.

30. A robotic vehicle, comprising:
a processor configured with processor-executable instructions to:
receive a disambiguation message from an observer's computing device, wherein the observer's computing device is different from an operator's computing device for controlling the robotic vehicle and wherein the disambiguation message includes a unique identifier of the robotic vehicle;

send the disambiguation message to the operator's computing device in response to receiving the disambiguation message; and
control one or more components of the robotic vehicle to execute an identifying/distinguishing task or maneuver based at least in part on the disambiguation message.

31. The robotic vehicle of claim 30, wherein the processor is further configured with processor-executable instructions to:
determine whether an emergency condition of the robotic vehicle is occurring; and
control one or more components of the robotic vehicle to execute a second identifying/distinguishing task or maneuver in response to determining that the emergency condition of the robotic vehicle is occurring.

32. The robotic vehicle of claim 30, wherein the processor is further configured with processor-executable instructions such that the identifying/distinguishing task or maneuver is one action or a series of actions.

33. The robotic vehicle of claim 32, wherein the processor is further configured with processor-executable instructions such that the one action or series of actions are one or more of performing a maneuver, controlling a visual indicator, generating an audible indicator, and sending data.

34. The robotic vehicle of claim 33, wherein the processor is further configured with processor-executable instructions such that controlling the visual indicator comprises activating or changing a light emitting device of the robotic vehicle.

35. A robotic vehicle, comprising:
means for sending a unique identifier of the robotic vehicle to an observer's computing device in response to an identifier request received from the observer's computing device, wherein the unique identifier is sent while the robotic vehicle is operating at least in part under control of an operator's computing device that is different from the observer's computing device;
means for receiving, in a processor of the robotic vehicle, a disambiguation message from the observer's computing device including the unique identifier of the robotic vehicle; and
means for controlling, by a processor of the robotic vehicle, one or more components of the robotic vehicle to execute an identifying/distinguishing task or maneuver in response to receiving the disambiguation message.

36. A robotic vehicle, comprising:
means for receiving a disambiguation message from an observer's computing device, wherein the observer's computing device is different from an operator's computing device for controlling the robotic vehicle and wherein the disambiguation message includes a unique identifier of the robotic vehicle;
means for sending the disambiguation message to the operator's computing device in response to receiving the disambiguation message; and
means for controlling one or more components of the robotic vehicle to execute an identifying/distinguishing task or maneuver based at least in part on the disambiguation message.

37. A processing device configured for use in a robotic vehicle and configured to:
send a unique identifier of the robotic vehicle to an observer's computing device in response to an identifier request received from the observer's computing device, wherein the unique identifier is sent while the robotic vehicle is operating at least in part under control of an operator's computing device that is different from the observer's computing device;
receive a disambiguation message from the observer's computing device including the unique identifier of the robotic vehicle; and
control one or more components of the robotic vehicle to execute an identifying/distinguishing task or maneuver in response to receiving the disambiguation message.

38. A processing device configured for use in a robotic vehicle and configured to:
receive a disambiguation message from an observer's computing device, wherein the observer's computing device is different from an operator's computing device for controlling the robotic vehicle and wherein the disambiguation message includes a unique identifier of the robotic vehicle;
send the disambiguation message to the operator's computing device in response to receiving the disambiguation message; and
control one or more components of the robotic vehicle to execute an identifying/distinguishing task or maneuver based at least in part on the disambiguation message.

* * * * *